(12) United States Patent
Zhang

(10) Patent No.: US 12,547,258 B2
(45) Date of Patent: Feb. 10, 2026

(54) FUNCTION MODE SWITCHING METHOD, ELECTRONIC DEVICE, AND SYSTEM

(71) Applicant: Honor Device Co., Ltd., Shenzhen (CN)

(72) Inventor: Beihang Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 228 days.

(21) Appl. No.: 18/043,824

(22) PCT Filed: Aug. 24, 2022

(86) PCT No.: PCT/CN2022/114529
§ 371 (c)(1),
(2) Date: Jun. 14, 2024

(87) PCT Pub. No.: WO2023/082768
PCT Pub. Date: May 19, 2023

(65) Prior Publication Data
US 2024/0411390 A1 Dec. 12, 2024

(30) Foreign Application Priority Data
Nov. 11, 2021 (CN) .......................... 202111335356.7

(51) Int. Cl.
G06F 3/038 (2013.01)
G06F 3/0346 (2013.01)
(Continued)

(52) U.S. Cl.
CPC .......... *G06F 3/0383* (2013.01); *G06F 3/0346* (2013.01); *G06F 3/03545* (2013.01);
(Continued)

(58) Field of Classification Search
CPC .. G06F 3/0383; G06F 3/04162; G06F 3/0346; G06F 3/03545; G06F 3/0483; G06F 3/04883; G06F 2203/0384
See application file for complete search history.

(56) References Cited

U.S. PATENT DOCUMENTS 9,329,703 B2 5/2016 Falkenburg et al.
9,400,570 B2 7/2016 Chang
(Continued)

FOREIGN PATENT DOCUMENTS

CN 101154136 A 4/2008
CN 103620529 A 3/2014
(Continued)

*Primary Examiner* — Yaron Cohen
(74) *Attorney, Agent, or Firm* — Slater Matsil, LLP

(57) ABSTRACT

This application discloses a function mode switching method, an electronic device, and a system, which relate to the field of terminal technologies. The method includes: establishing, by a stylus and the electronic device, a wireless communication connection. The stylus may have a plurality of different function modes. The plurality of different functional modes may include a first mode and a second mode. The stylus may be switched between the first mode and the second mode. A stylus may send different function signals to the electronic device in response to a received input based on different function modes, so that the electronic device performs a corresponding function in response to the function signal.

20 Claims, 23 Drawing Sheets

(51) Int. Cl.
*G06F 3/0354* (2013.01)
*G06F 3/041* (2006.01)
*G06F 3/0483* (2013.01)
*G06F 3/04883* (2022.01)

(52) U.S. Cl.
CPC ........ *G06F 3/04162* (2019.05); *G06F 3/0483* (2013.01); *G06F 3/04883* (2013.01); *G06F 2203/0384* (2013.01)

(56) References Cited

U.S. PATENT DOCUMENTS

| | | | |
|---|---|---|---|
| 9,632,595 | B2 | 4/2017 | Park et al. |
| 10,719,142 | B2 | 7/2020 | Kaplan et al. |
| 11,874,978 | B2 | 1/2024 | Kang et al. |
| 2013/0257777 | A1 | 10/2013 | Benko et al. |
| 2014/0210744 | A1 | 7/2014 | Song et al. |
| 2014/0253463 | A1 | 9/2014 | Hicks |
| 2016/0054821 | A1 | 2/2016 | Kim et al. |
| 2016/0139690 | A1 | 5/2016 | Chang |
| 2016/0274683 | A1 | 9/2016 | Nicholson et al. |
| 2016/0334921 | A1 | 11/2016 | Oakley |
| 2017/0255328 | A1 | 9/2017 | Zyskind |
| 2017/0322665 | A1 | 11/2017 | Shim et al. |
| 2017/0357335 | A1 | 12/2017 | Carlen et al. |
| 2019/0369870 | A1 | 12/2019 | Marsden et al. |
| 2020/0050350 | A1 | 2/2020 | Lee et al. |
| 2020/0201505 | A1 | 6/2020 | Jung et al. |
| 2021/0056878 | A1* | 2/2021 | Lee .................. G06F 3/041 |
| 2021/0208831 | A1 | 7/2021 | Zhang et al. |
| 2021/0311563 | A1 | 10/2021 | Kwon et al. |
| 2022/0187930 | A1 | 6/2022 | Kang et al. |
| 2023/0195244 | A1 | 6/2023 | Xi et al. |

FOREIGN PATENT DOCUMENTS

| | | |
|---|---|---|
| CN | 103631514 A | 3/2014 |
| CN | 105183191 A | 12/2015 |
| CN | 105607763 A | 5/2016 |
| CN | 106104428 A | 11/2016 |
| CN | 106557185 A | 4/2017 |
| CN | 106775057 A | 5/2017 |
| CN | 111164539 A | 5/2020 |
| CN | 111587414 A | 8/2020 |
| CN | 112947773 A | 6/2021 |
| CN | 113238649 A | 8/2021 |
| CN | 113268174 A | 8/2021 |
| CN | 113268175 A | 8/2021 |
| CN | 114415850 A | 4/2022 |
| KR | 20140096752 A | 8/2014 |
| KR | 20210017099 A | 2/2021 |
| WO | 2021135885 A1 | 7/2021 |

* cited by examiner

FUNCTION MODE SWITCHING METHOD, ELECTRONIC DEVICE, AND SYSTEM

CROSS-REFERENCE TO RELATED APPLICATIONS

This application is a national stage of International Application No. PCT/CN2022/114529, filed on Aug. 24, 2022, which claims priority to Chinese Patent Application No. 202111335356.7, filed on Nov. 11, 2021. The disclosures of both of the aforementioned applications are hereby incorporated by reference in their entireties.

TECHNICAL FIELD

This application relates to the field of terminal technologies, and in particular, to a function mode switching method, an electronic device, and a system.

BACKGROUND

With the development of terminal technologies, the application of electronic devices in daily life has become increasingly extensive. For an electronic device equipped with a stylus (for example, a large screen, a mobile phone, and a tablet computer, or the like), a user more frequently performs operations such as tapping, writing, and erasing handwriting on the electronic device by using the stylus.

Currently, when the user performs operations such as tapping, writing, and erasing handwriting on the electronic device by using the stylus, the stylus needs to be brought into contact with a touch screen on the electronic device. The stylus and the electronic device may cause the stylus to perform the foregoing operations based on the electronic device through the interaction of electrical signals and according to a change of a capacitance value on the touch screen in the electronic device. However, in some application scenarios (for example, a screen mirroring scenario), the stylus cannot send an electrical signal to the electronic device at a long distance to cause the stylus to perform a specified function (for example, page turning function, or the like) in response to the electrical signal. Therefore, the operation is very inconvenient.

SUMMARY

This application provides a function mode switching method, an electronic device, and a system, which implements that a stylus may send different function signals to the electronic device in response to a received input based on different function modes, to cause the electronic device to perform a corresponding function in response to the function signal. The operation is very convenient, and the stylus may be applied in a wider range of scenarios.

According to a first aspect, this application provides a function mode switching method, the method including: establishing, by the stylus and the electronic device, a wireless communication connection, where the stylus is in a first mode; detecting, by the stylus, a first input; in response to the first input, sending, by the stylus, a first function signal corresponding to the first input in the first mode based on the wireless communication connection; performing, by the electronic device, a first function based on the first function signal; switching, by the stylus, from the first mode to a second mode in a case that the stylus detects that strength of an electrical signal released by a touch control screen in the electronic device is less than a first value; detecting, by the stylus, a second input; detecting, by the stylus, position information of the stylus; in response to the second input, sending, by the stylus, a second function signal corresponding to the second input in the second mode and the position information based on the wireless communication connection; and performing, by the electronic device, a second function based on the second function signal and the position information. In this way, by implementing the method, the operation is very convenient, and the stylus may be applied in a wider range of scenarios.

In a possible implementation, the wireless communication connection is: a Bluetooth communication connection, or a wireless local area network WLAN communication connection.

In a possible implementation, the first input includes any one of the following: an upward swiping operation for a touch sensor region in the stylus, a downward swiping operation for the touch sensor region in the stylus, or an operation of double-clicking the touch sensor region.

In a possible implementation, the performing, by the electronic device, a first function based on the first function signal specifically includes: displaying, by the electronic device, handwriting; receiving, by the electronic device, the first function signal; determining, by the electronic device, a position of the stylus on a touch control screen in the electronic device through a downlink signal sent by an electrode in the stylus; and canceling, by the electronic device, a display of handwriting of the position on the touch control screen based on the first function signal. In this way, a function of erasing handwriting may be implemented. The operation is very convenient, and the stylus may be applied in a wider range of scenarios.

In a possible implementation, the performing, by the electronic device, a first function based on the first function signal specifically includes: displaying, by the electronic device, a first page; receiving, by the electronic device, the first function signal; displaying, by the electronic device, a second page in response to the first function signal, where the second page is a previous-level page of the first page. In this way, a function of turning pages to display different pages may be implemented. The operation is very convenient, and the stylus may be applied in a wider range of scenarios.

In a possible implementation, the performing, by the electronic device, a first function based on the first function signal specifically includes: displaying, by the electronic device, a first page; receiving, by the electronic device, the first function signal; displaying, by the electronic device, a third page in response to the first function signal, where the third page is a next-level page of the first page. In this way, a function of turning pages to display different pages may be implemented. The operation is very convenient, and the stylus may be applied in a wider range of scenarios.

In a possible implementation, the performing, by the electronic device, a second function based on the second function signal and the position information specifically includes: displaying, by the electronic device, handwriting of a corresponding position of the position information based on the second function signal and the position information. In this way, a function of long-distance handwriting may be implemented. The operation is very convenient, and the stylus may be applied in a wider range of scenarios.

In a possible implementation, the performing, by the electronic device, a second function based on the second function signal and the position information specifically includes: displaying, by the electronic device, a cursor; and displaying, by the electronic device, a cursor movement trajectory of a corresponding position of the position information based on the second function signal and the position information. In this way, a function of controlling the movement of the cursor at a long distance may be implemented. The operation is very convenient, and the stylus may be applied in a wider range of scenarios.

In a possible implementation, the second input includes any one of the following: pressing a front-side region of a touch sensor in the stylus and moving the stylus, pressing a back-side region of the touch sensor in the stylus and moving the stylus, an upward swiping operation for a touch sensor region in the stylus, a downward swiping operation for the touch sensor region in the stylus, or an operation of double-clicking the touch sensor region.

In a possible implementation, the position information is detected and obtained by a gyroscope in the stylus.

In a possible implementation, the method further includes: detecting, by the stylus, the first input; in response to the first input, sending, by the stylus, a third function signal corresponding to the first input in the second mode based on the wireless communication connection; and performing, by the electronic device, a third function based on the third function signal;

In a possible implementation, the performing, by the electronic device, a third function based on the third function signal specifically includes: displaying, by the electronic device, a cursor, where the cursor is located in an application icon region of a first application; receiving, by the electronic device, the third function signal; and starting, by the electronic device, the first application in response to the third function signal. In this way, a function of starting a selected application at a long distance by using the stylus may be implemented. The operation is very convenient, and the stylus may be applied in a wider range of scenarios.

In a possible implementation, the performing, by the electronic device, a third function based on the third function signal specifically includes: displaying, by the electronic device, a first page; receiving, by the electronic device, the third function signal; and displaying, by the electronic device, a first region on the first page in response to the third function signal, where the first region is an upper part region on the first page. In this way, a function of controlling a page display region at a long distance by using the stylus may be implemented. The operation is very convenient, and the stylus may be applied in a wider range of scenarios.

In a possible implementation, the performing, by the electronic device, a third function based on the third function signal specifically includes: displaying, by the electronic device, a first page; receiving, by the electronic device, the third function signal; and displaying, by the electronic device, a second region on the first page in response to the third function signal, where the second region is a lower part region on the first page. In this way, a function of controlling a page display region at a long distance by using the stylus may be implemented. The operation is very convenient, and the stylus may be applied in a wider range of scenarios.

According to a second aspect, this application provides a stylus, including: a processor, a touch sensor, a motion sensor, and a wireless communication module. The wireless communication module is configured to establish a wireless communication connection with an electronic device; the touch sensor is configured to detect a first input; the wireless communication module is configured to send, in response to the first input, a first function signal corresponding to the first input in a first mode; the processor is configured to control the stylus to switch from the first mode to a second mode in response to detecting that strength of an electrical signal released by a touch control screen in the electronic device is less than a first value; the touch sensor is further configured to detect a second input; the motion sensor is configured to detect position information of the stylus; and the wireless communication module is further configured to send, in response to the second input, a second function signal corresponding to the second input in the second mode and the position information to the electronic device. In this way, the method is implemented based on the stylus. The operation is very convenient, and the stylus may be applied in a wider range of scenarios.

In a possible implementation, the first input includes any one of the following: an upward swiping operation for a touch sensor region in the stylus, a downward swiping operation for the touch sensor region in the stylus, or an operation of double-clicking the touch sensor region.

In a possible implementation, the wireless communication connection is: a Bluetooth communication connection, or a wireless local area network WLAN communication connection.

In a possible implementation, the second input includes any one of the following: pressing a front-side region of a touch sensor in the stylus and moving the stylus, pressing a back-side region of the touch sensor in the stylus and moving the stylus, an upward swiping operation for a touch sensor region in the stylus, a downward swiping operation for the touch sensor region in the stylus, or an operation of double-clicking the touch sensor region.

In a possible implementation, the stylus further includes an electrode; and the electrode is configured to send a downlink signal to the electronic device.

In a possible implementation, the touch sensor is further configured to detect the first input; and the wireless communication module is further configured to send, in response to the second input, a third function signal corresponding to the first input in the second mode to the electronic device.

According to a third aspect, this application provides an electronic device, including: a processor, a touch control screen, an electrode signal sensing array, and a wireless communication module, where the electrode signal sensing array is integrated in the touch control screen. The wireless communication module is configured to establish a wireless communication connection with a stylus; the wireless communication module is further configured to receive a first function signal; the processor is configured to perform a first function based on the first function signal; the electrode signal sensing array is configured to send an electrical signal to the stylus; the wireless communication module is further configured to receive a second function signal and position information of the stylus; and the processor is further configured to perform a second function based on the second function signal and the position information. In this way, the method is implemented based on the electronic device. The operation is very convenient, and the stylus may be applied in a wider range of scenarios.

In a possible implementation, the wireless communication connection is: a Bluetooth communication connection, or a wireless local area network WLAN communication connection.

In a possible implementation, the touch control screen is configured to display handwriting; and after the wireless communication module receives the first function signal, the processor is specifically configured to: determine a position of the stylus on the touch control screen through a downlink signal sent by an electrode in the stylus; and cancel a display of handwriting of the position on the touch control screen based on the first function signal. In this way, a function of erasing handwriting may be implemented. The operation is very convenient, and the stylus may be applied in a wider range of scenarios.

In a possible implementation, the touch control screen is configured to display a first page; and after the wireless communication module receives the first function signal, the processor is specifically configured to: cause the touch control screen to display a second page in response to the first function signal, where the second page is a previous-level page of the first page. In this way, a function of turning pages to display different pages may be implemented. The operation is very convenient, and the stylus may be applied in a wider range of scenarios.

In a possible implementation, the touch control screen is configured to display a first page; and after the wireless communication module receives the first function signal, the processor is specifically configured to: cause the touch control screen to display a third page in response to the first function signal, where the third page is a next-level page of the first page. In this way, a function of turning pages to display different pages may be implemented. The operation is very convenient, and the stylus may be applied in a wider range of scenarios.

In a possible implementation, the processor is specifically configured to cause the touch control screen to display handwriting of a corresponding position of the position information based on the second function signal and the position information. In this way, a function of long-distance handwriting may be implemented. The operation is very convenient, and the stylus may be applied in a wider range of scenarios.

In a possible implementation, the processor is specifically configured to: cause the touch control screen to display a cursor; and cause the touch control screen to display a cursor movement trajectory of a corresponding position of the position information based on the second function signal and the position information. In this way, a function of controlling the movement of the cursor at a long distance may be implemented. The operation is very convenient, and the stylus may be applied in a wider range of scenarios.

In a possible implementation, the wireless communication module is further configured to receive a third function signal; and the processor is further configured to perform a third function based on the third function signal.

In a possible implementation, the touch control screen is configured to display a first page; and after the wireless communication module receives the third function signal, the processor is specifically configured to: cause the touch control screen to display a first region on the first page in response to the third function signal, where the first region is an upper part region on the first page. In this way, a function of controlling a page display region at a long distance by using the stylus may be implemented. The operation is very convenient, and the stylus may be applied in a wider range of scenarios.

In a possible implementation, the touch control screen is configured to display a first page; and after the wireless communication module receives the third function signal, the processor is specifically configured to: cause the touch control screen to display a second region on the first page in response to the third function signal, where the second region is a lower part region on the first page. In this way, a function of controlling a page display region at a long distance by using the stylus may be implemented. The operation is very convenient, and the stylus may be applied in a wider range of scenarios.

In a possible implementation, the touch control screen is configured to display a cursor, where the cursor is located in an application icon region of a first application; and after the wireless communication module receives the third function signal, the processor is specifically configured to: start the first application in response to the third function signal. In this way, a function of starting a selected application at a long distance by using the stylus may be implemented. The operation is very convenient, and the stylus may be applied in a wider range of scenarios.

According to a fourth aspect, this embodiment of this application provides a computer storage medium, storing a computer program, the computer program including executable instructions, the executable instructions, when executed by a processor, causing the processor to perform the method in any one of the possible implementations of the first aspect. Based on the processor, the method provided in this application is implemented. The operation is very convenient, and the stylus may be applied in a wider range of scenarios.

DETAILED DESCRIPTION OF ILLUSTRATIVE EMBODIMENTS

Terms used in the following embodiments of this application are only intended to describe particular embodiments, and are not intended to limit this application. As used in this specification and the claims of this application, a singular expression form, "one", "a", "said", "foregoing", "the", or "this", is intended to also include a plural expression form, unless clearly indicated to the contrary in the context. It should be further understood that the term "and/or" used in this application indicates and includes any or all possible combinations of one or more listed items. In this embodiment of this application, the terms "first" and "second" are used merely for the purpose of description, and shall not be construed as indicating or implying relative importance or implying a quantity of indicated technical features. Therefore, a feature defined to be "first" or "second" may explicitly or implicitly include one or more features. In the description of this embodiment of this application, unless otherwise stated, "a plurality of" refers to two or more.

First, a communication system provided in an embodiment of this application is introduced.

Figure 1:
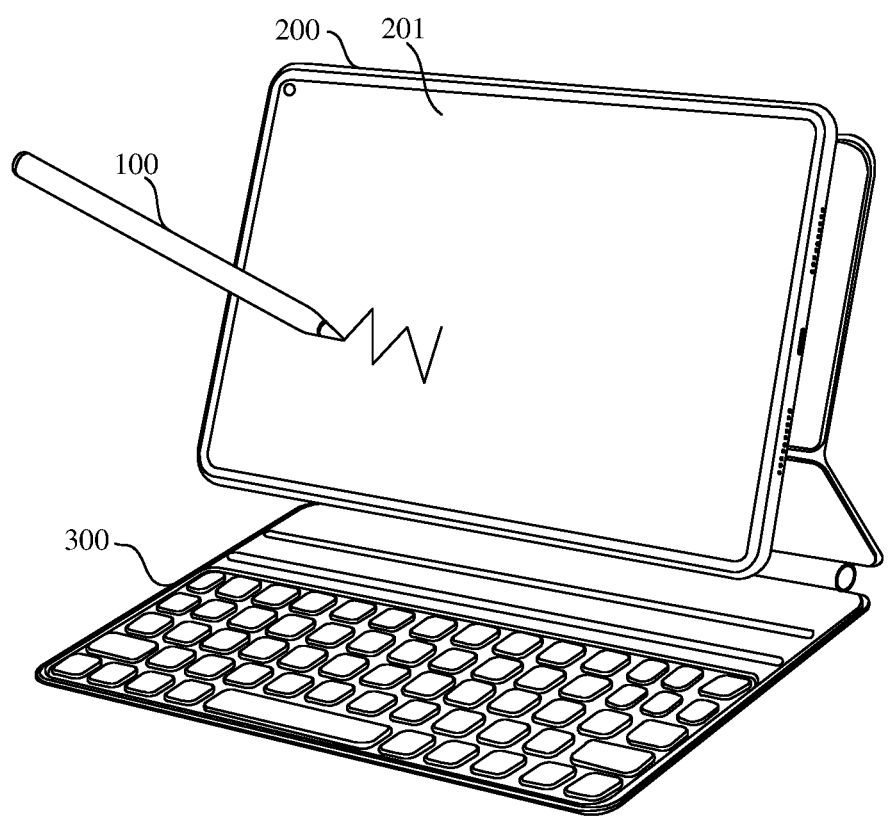
FIG. 1 is a schematic diagram of an architecture of a communication system according to an embodiment of this application.

FIG. 1 exemplarily shows a schematic diagram of an architecture of a communication system according to an embodiment of this application.

As shown in FIG. 1, the communication system may include a stylus 100, an electronic device 200, and a wireless keyboard 300. The electronic device 200 may be referred to as user equipment (user equipment, UE), a terminal (terminal), or the like. For example, the electronic device 200 may be a mobile terminal or a fixed terminal with a touch control screen (also referred to as a touch screen), such as a portable android device (portable android device, PAD), a personal digital assistant (personal digital assistant, PDA), a handheld device with a wireless communication function, a computing device, an in-vehicle device, a wearable device, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. In this embodiment, a description is made by using the electronic device 200 as the portable android device as an example.

The stylus 100 and the wireless keyboard 300 may provide an input to the electronic device 200, and the electronic device 200 performs an operation in response to the input based on an input of the stylus 100 or the wireless keyboard 300. A touch control region may be set on the wireless keyboard 300, the stylus 100 may operate the touch control region of the wireless keyboard 300 to provide an input to the wireless keyboard 300, and the wireless keyboard 300 may perform, based on the input of the stylus 100, an operation in response to the input. In an embodiment, interconnection may be performed between the stylus 100 and the electronic device 200, between the stylus 100 and the wireless keyboard 300, and between the electronic device 200 and the wireless keyboard 300 through a communication network to implement the interaction of wireless signals. The communication network may be, but is not limited to, a short-distance communication network such as a WI-FI hotspot network, a WI-FI peer-to-peer (peer-to-peer, P2P) network, a Bluetooth network, a zigbee network, or a near field communication (near field communication, NFC) network.

The stylus 100 may be, but is not limited to, an inductance pen and a capacitance pen. The electronic device 200 has a touch control screen 201. When a stylus 100 is an inductance pen, an electromagnetic induction board needs to be integrated on the touch control screen 201 of the electronic device 200 that interacts with the stylus 100. Coils are distributed on the electromagnetic induction board, and coils are also integrated in the inductance pen. Based on the principle of electromagnetic induction, within a range of the magnetic field generated by the electromagnetic induction board, with the movement of the inductance pen, the inductance pen may store electrical energy. The inductance pen may transmit, through the coils in the inductance pen, the accumulated electrical energy to the electromagnetic induction board through free oscillation. The electromagnetic induction board may scan the coils on the electromagnetic induction board based on the electrical energy from the inductance pen to perform calculation on a position of the inductance pen on the touch control screen 201. In an embodiment, the touch control screen may be referred to as a touch screen. The stylus may be referred to as a touch pen.

The capacitance pen may include: a passive capacitance stylus and an active capacitance stylus. The passive capacitance pen may be referred to as a passive capacitance pen, and the active capacitance pens be referred to as an active capacitance pen.

One or more electrodes may be set in the active capacitance pen (for example, in a pen tip), and the active capacitance pen may transmit a signal through the electrodes. When the stylus 100 is the active capacitance pen, an electrode signal sensing array needs to be integrated on the touch control screen 201 of the electronic device 200 that interacts with the stylus 100. In an embodiment, the electrode signal sensing array may be a capacitive electrode signal sensing array. The electronic device 200 may receive a signal from the active capacitance pen through the electrode signal sensing array. When the signal is received, a position of the active capacitance pen on the touch control screen and an inclination angle of the active capacitance pen are identified based on a change of a capacitance value on the touch control screen 201.

Next, a structure of a stylus provided in this embodiment of this application is introduced.

Figure 2A:
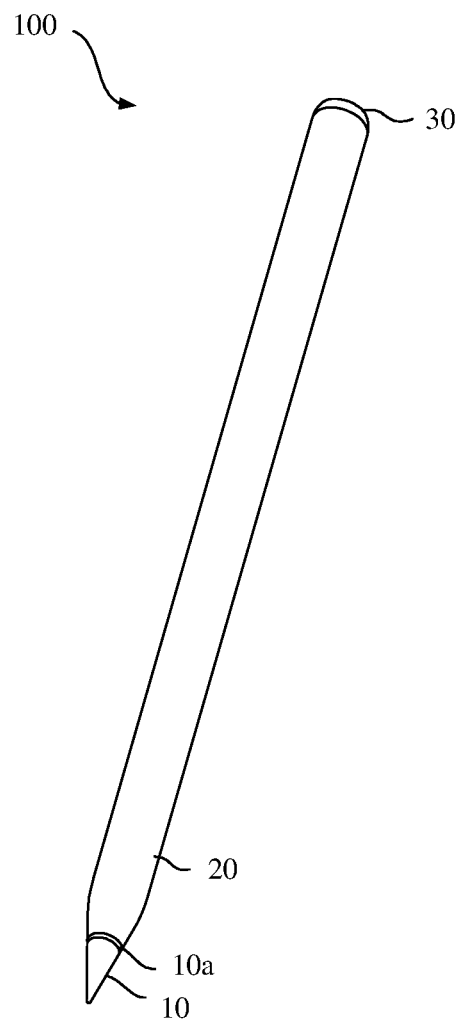
FIG. 2A to FIG. 2C are schematic diagrams of a stylus according to an embodiment of this application.
Figure 2B:
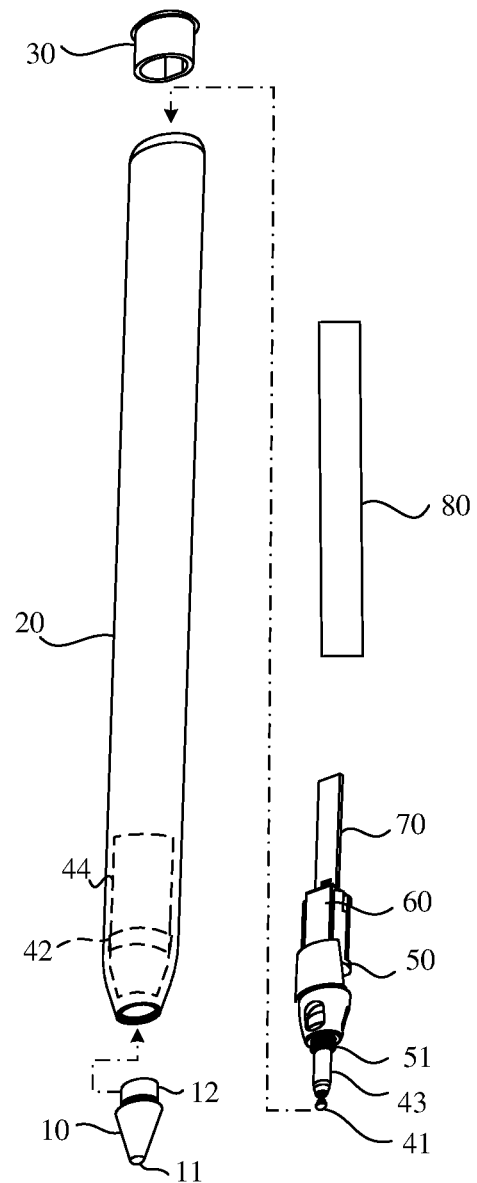
Figure 2C:
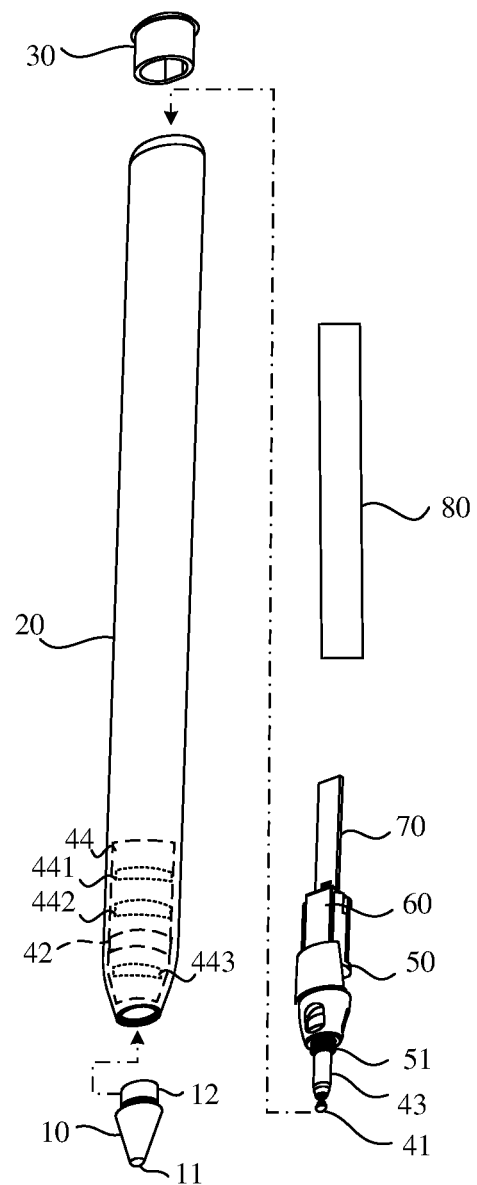

FIG. 2A to FIG. 2C exemplarily show a schematic structural diagram of a stylus 100 according to an embodiment of this application.

FIG. 2A is a schematic structural diagram of a stylus 100 according to an embodiment of this application. The stylus 100 uses an active capacitance pen as an example. Referring to FIG. 2A, the stylus 100 may include a pen tip 10, a pen holder 20, and a rear cover 30. The inside of the pen holder 20 is a hollow structure, and the pen tip 10 and the rear cover 30 are respectively located at two ends of the pen holder 20. The rear cover 30 and the pen holder 20 may be plugged or engaged together, and for an engagement relationship between the pen tip 10 and the pen holder 20, reference may be made to the description in FIG. 2B.

FIG. 2B is a schematic diagram of a partially disassembled structure of a stylus according to an embodiment of this application. Referring to FIG. 2B, the stylus 100 further includes a main shaft assembly 50. The main shaft assembly 50 is located in the pen holder 20, and the main shaft assembly 50 may be slidably arranged in the pen holder 20. The main shaft assembly 50 has an external thread 51, and the pen tip 10 includes a writing end 11 and a connection end 12, where the connection end 12 of the pen tip 10 has an internal thread (not shown) engaged with the external thread 51.

When the main shaft assembly 50 is assembled into the pen holder 20, the connection end 12 of the pen tip 10 extends into the pen holder 20 and is in threaded connection with the external thread 51 of the main shaft assembly 50.

In some other examples, connection between the connection end 12 of the pen tip 10 and the main shaft assembly 50 may further be implemented in a detachable manner of engagement, or the like. The connection end 12 of the pen tip 10 is in detachable connection with the main shaft assembly 50, so that the replacement of the pen tip 10 is implemented.

To detect the pressure on the writing end 11 of the pen tip 10, referring to FIG. 2A, there is a gap 10a between the pen tip 10 and the pen holder 20. In this way, it is ensured that when an external force is exerted on the writing end 11 of the pen tip 10, the pen tip 10 may move toward the pen holder 20, and the movement of the pen tip 10 drives the main shaft assembly 50 to move within the pen holder 20. For the detection of the external force, as shown in FIG. 2B, the main shaft assembly 50 is provided with a pressure sensing assembly 60, a part of the pressure sensing assembly 60 is in fixed connection with a fixed structure in the pen holder 20, and a part of the pressure sensing assembly 60 is in fixed connection with the main shaft assembly 50. In this way, when the main shaft assembly 50 moves with the pen tip 10, because a part of the pressure sensing assembly 60 is in fixed connection with the fixed structure in the pen holder 20, the movement of the main shaft assembly 50 drives the pressure sensing assembly 60 to deform, and the deformation of the pressure sensing assembly 60 is transmitted to a circuit board 70 (for example, electrical connection between the pressure sensing assembly 60 and the circuit board 70 may be implemented through a wire or a flexible circuit board). The circuit board 70 detects the pressure of the writing end 11 of the pen tip 10 according to the deformation of the pressure sensing assembly 60, so as to control a thickness of a line of the writing end 11 according to the pressure of the writing end 11 of the pen tip 10.

It should be noted that, pressure detection of the pen tip 10 includes, but is not limited to, the foregoing method. For example, by arranging a pressure sensor in the writing end 11 of the pen tip 10, the pressure of the pen tip 10 may further be detected by the pressure sensor.

In this embodiment, referring to FIG. 2B, the stylus 100 further includes a plurality of electrodes, and the plurality of electrodes may be, for example, a first emission electrode 41, a grounding electrode 43, and a second emission electrode 42. The first emission electrode 41, the grounding electrode 43, and the second emission electrode 42 are all electrically connected with the circuit board 70. The first emission electrode 41 may be located in the pen tip 10 and be close to the writing end 11, the circuit board 70 may be configured as a control board that may respectively provide signals to the first emission electrode 41 and the second emission electrode 42, and the first emission electrode 41 is configured to emit a first signal. When the first emission electrode 41 is close to the touch control screen 201 of the electronic device 200, a coupling capacitance may be formed between the first emission electrode 41 and the touch control screen 201 of the electronic device 200, so that the electronic device 200 may receive the first signal. The second emission electrode 42 is configured to emit a second signal, and the electronic device 200 may determine an inclination angle of the stylus 100 according to a received second signal. In this embodiment of this application, the second emission electrode 42 may be located on an inner wall of the pen holder 20. In an example, the second emission electrode 42 may also be located on the main shaft assembly 50.

The grounding electrode 43 may be located between the first emission electrode 41 and the second emission electrode 42, or the grounding electrode 43 may be located around an outer periphery of the first emission electrode 41 and the second emission electrode 42. The grounding electrode 43 is configured to reduce the coupling between the first emission electrode 41 and the second emission electrode 42.

When the electronic device 200 receives the first signal from the stylus 100, a capacitance value at the corresponding position of the touch control screen 201 changes. Accordingly, the electronic device 200 may determine a position of the stylus 100 (or the pen tip of the stylus 100) on the touch control screen 201 based on a change of the capacitance value on the touch control screen 201. In addition, the electronic device 200 may obtain the inclination angle of the stylus 100 by using a double-pen tip projection method in an inclination angle detection algorithm. Positions of the first emission electrode 41 and the second emission electrode 42 in the stylus 100 are different. Therefore, when the electronic device 200 receives the first signal and the second signal from the stylus 100, capacitance values at two positions of the touch control screen 201 change. The electronic device 200 may obtain the inclination angle of the stylus 100 according to a distance between the first emission electrode 41 and the second emission electrode 42 and a distance between the two positions on the touch control screen 201 on which the capacitance value changes. For more details about obtaining the inclination angle of the stylus 100, reference may be made to the related description about the double-pen tip projection method in the related art.

In this embodiment of this application, referring to FIG. 2B, the stylus 100 further includes: a battery assembly 80, where the battery assembly 80 is configured to provide a power supply to the circuit board 70. The battery assembly 80 may include a lithium-ion battery, or the battery assembly 80 may include a nickel-chromium battery, an alkaline battery, a nickel-metal hydride battery, or the like. In an embodiment, a battery included in the battery assembly 80 may be a rechargeable battery or a disposable battery, where when the battery included in the battery assembly 80 is the rechargeable battery, the stylus 100 may charge the battery in the battery assembly 80 in a wireless charging manner. Certainly, the battery in the battery assembly 80 may also be charged in a wired charging manner. For example, a power supply connector (not shown in the figure) is arranged at one end of the pen holder 20 close to the rear cover 30, and the power supply connector is connected with the battery assembly 80. The rear cover 30 may shield the power supply connector.

As shown in FIG. 2C, the stylus 100 may further include: a touch sensor 44. The touch sensor 44 may be arranged in a region of the pen holder 20 close to the pen tip 10. The touch sensor 44 may be configured to detect a touch operation performed on or near the touch sensor 44. In some embodiments, the touch sensor 44 may include a region 441, a region 442, and a region 443. Within a specified time period 1 (for example, two seconds), when the touch sensor 44 detects a long-pressing operation performed on the region 442 and remains unchanged, and detects a touch operation on the touch sensor, a direction of the touch operation is parallel to the pen holder 20. When a touch region covers the region 441 and the region 443, the touch sensor 44 determines that the operation is a swiping operation. For example, when the touch sensor 44 detects a long-pressing operation performed on the region 442 and remains unchanged, and detects a touch operation on the touch sensor, a direction of the touch operation is parallel to the pen holder 20. When a movement position of the touch operation is changed from the region 443 to the region 441, the touch sensor 44 determines that the operation is an upward swiping operation (which may also be referred to as an upward swiping operation). When the touch sensor 44 detects a long-pressing operation performed on the region 442 and remains unchanged, and detects a touch operation on the touch sensor, a direction of the touch operation is parallel to the pen holder 20. When a movement position of the touch operation is changed from the region 441 to the region 443, the touch sensor 44 determines that the operation is a downward swiping operation (which may also be referred to as a downward swiping operation).

In response to the swiping operation, the stylus 100 may send a corresponding function signal to the electronic device 200, so that the electronic device 200 may perform a corresponding function based on the function signal.

In a possible implementation, the stylus 100 may further detect, within a specified time period 1 (for example, two seconds), a direction of the touch operation is parallel to the pen holder 20, and when a touch region covers the region 441 and the region 443, it is determined that the operation is a swiping operation. This is not limited in this application, for the description of the movement position of the touch operation in the upward swiping operation and the downward swiping operation, reference may be made to the foregoing description, which is not repeated herein.

Figure 3:
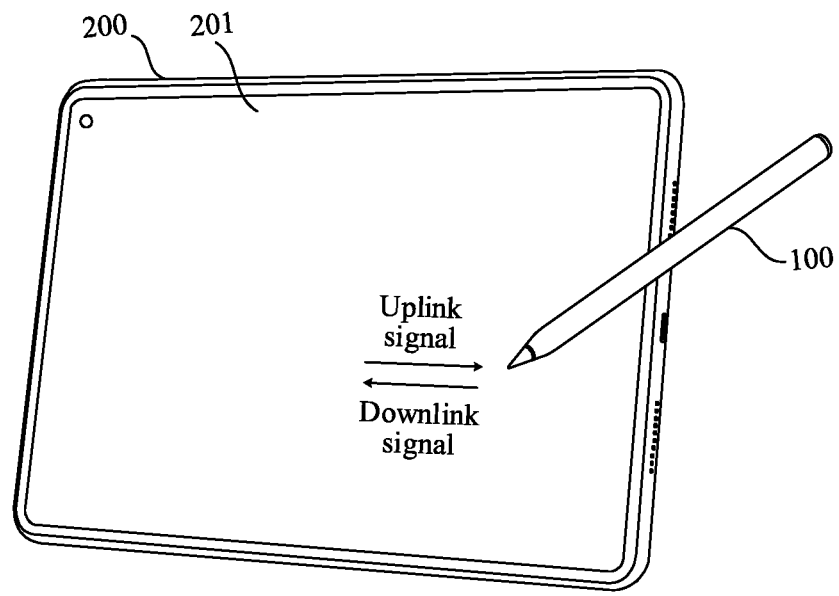
FIG. 3 is a schematic diagram of signal interaction between a stylus and an electronic device according to an embodiment of this application.

As shown in FIG. 3, when the stylus 100 is an active capacitance pen, after the electronic device 200 is wirelessly connected with the stylus 100, the electronic device 200 may send an uplink signal to the stylus 100 through the electrode signal sensing array integrated on the touch control screen 201. The stylus 100 may receive the uplink signal through a received electrode, and the stylus 100 emits a downlink signal through the emission electrodes (for example, the first emission electrode 41 and the second emission electrode 42). The downlink signal includes the first signal and the second signal. When the pen tip 10 of the stylus 100 comes into contact with the touch control screen 201, the capacitance value at the corresponding position of the touch control screen 201 changes. The electronic device 200 may determine a position of the pen tip 10 of the stylus 100 on the touch control screen 201 based on the capacitance value on the touch control screen 201. In an embodiment, the uplink signal and the downlink signal may be square wave signals.

Next, a structure of a wireless keyboard provided in an embodiment of this application is introduced.

Figure 4:
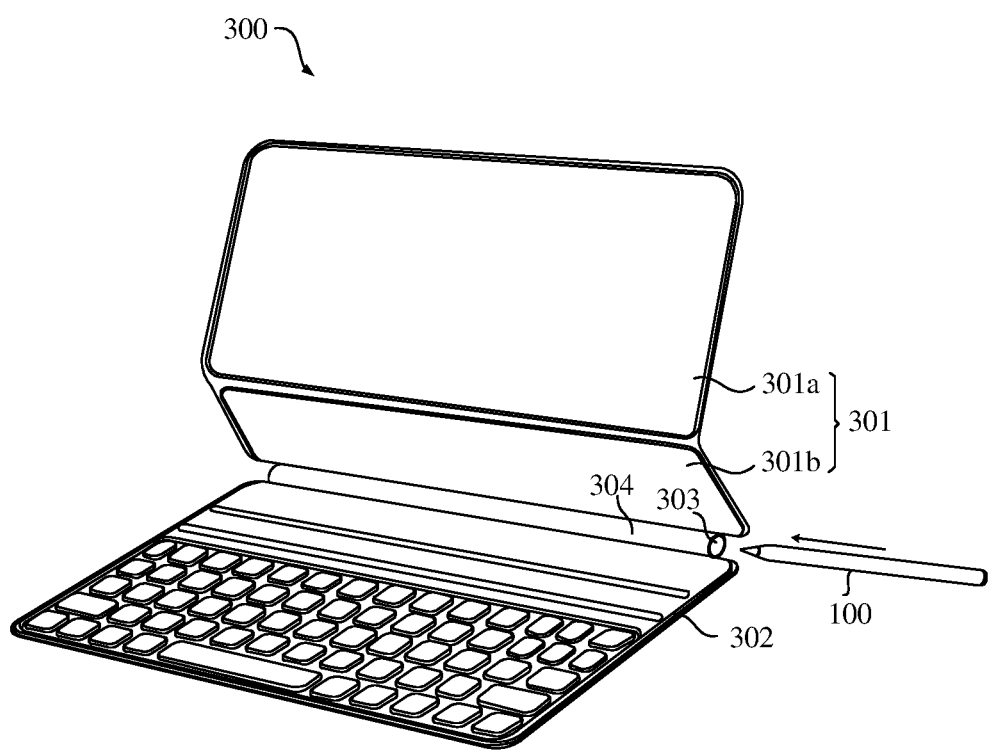
FIG. 4 is a schematic structural diagram of a wireless keyboard according to an embodiment of this application.

FIG. 4 exemplarily shows a schematic structural diagram of a wireless keyboard 300 according to an embodiment of this application.

As shown in FIG. 4, the wireless keyboard 300 may include a first part 301 and a second part 302. For example, the wireless keyboard 300 may include: a keyboard body and a keyboard cover. The first part 301 may be the keyboard cover, and the second part 302 may be the keyboard body. The first part 301 is configured to place the electronic device 200, and the second part 302 may be provided with a button or a touch pad used for a user operation.

When the wireless keyboard 300 is in use, the first part 301 and the second part 302 of the wireless keyboard 300 need to be opened. When the wireless keyboard 300 is not in use, the first part 301 and the second part 302 of the wireless keyboard 300 may be closed. In an embodiment, the first part 301 of the wireless keyboard 300 may be rotatably connected with the second part 302 of the wireless keyboard 300. For example, the first part 301 and the second part 302 may be connected by a rotating shaft or a hinge. Alternatively, in some examples, the first part 301 is rotatably connected with the second part 302 by a flexible material (for example, a leather material or a cloth material). Alternatively, in some examples, the first part 301 and the second part 302 may be integrally formed, and a thickness of a connection portion between the first part 301 and the second part 302 is reduced, so that the connection portion between the first part 301 and the second part 302 may be bent. A connection manner between the first part 301 and the second part 302 may include, but is not limited to, the foregoing several rotatable connection manners.

The first part 301 may include at least two rotatably connected holders. For example, referring to FIG. 4, the first part 301 includes a first holder 301a and a second holder 301b, and the first holder 301a is rotatably connected with the second holder 301b. During use, the first holder 301a and the second holder 301b may be configured to jointly support the electronic device 200 (referring to FIG. 1). Alternatively, the first holder 301a provides support for the second holder 301b, and the second holder 301b supports the electronic device 200. Referring to FIG. 4, the second holder 301b is rotatably connected with the second part 302.

Referring to FIG. 4, to facilitate the storage of the stylus 100, the wireless keyboard 300 may be provided with a storage portion 303 for storing the stylus 100. Referring to FIG. 4, the storage portion 303 is a cylindrical cavity. During storing, the stylus 100 is inserted into a storage cavity in a direction of the arrow in FIG. 4. In this embodiment, referring to FIG. 4, the second part 302 is rotatably connected with the second holder 301b by the connection portion 304, and the storage portion 303 is arranged in the connection portion 304. The connection portion 304 may be a rotating shaft.

Figure 5A:
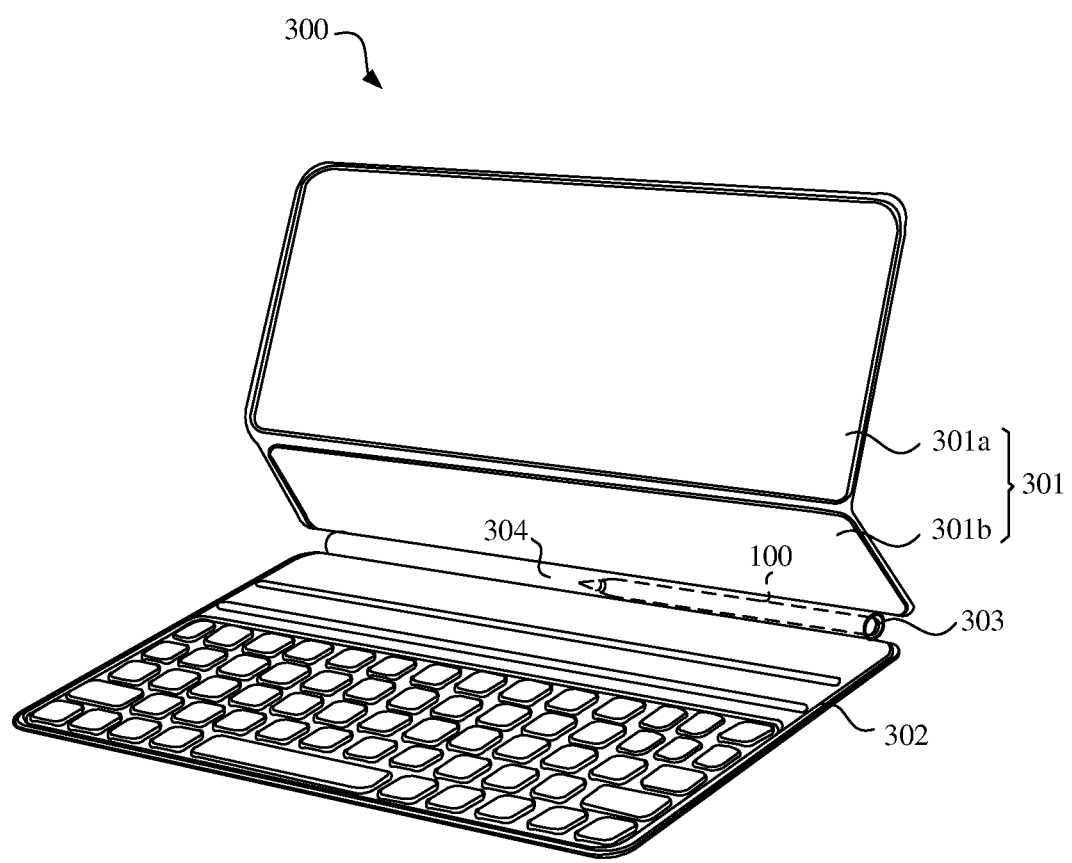
FIG. 5A is a schematic diagram of a stylus being stored in a storage portion according to an embodiment of this application.
Figure 5B:
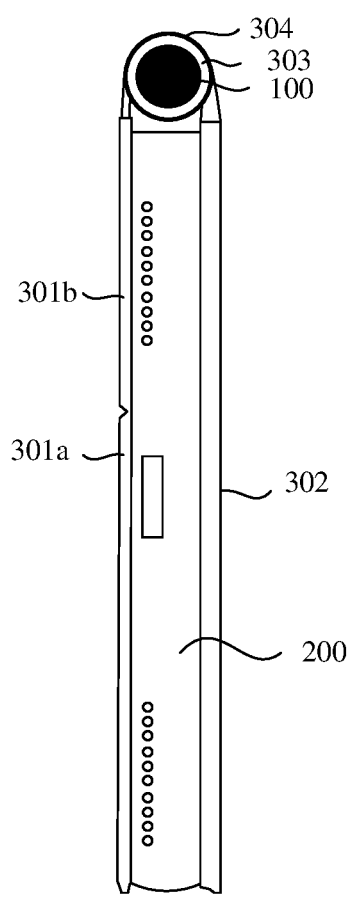
FIG. 5B is a schematic diagram of a side surface of a stylus being stored in a storage portion of a wireless keyboard according to an embodiment of this application.

FIG. 5A is a schematic diagram of a stylus 100 being stored in a storage portion according to an embodiment of this application. FIG. 5B is a schematic diagram of a side surface of a stylus 100 being stored in a storage portion of a wireless keyboard according to an embodiment of this application. Referring to FIG. 5B, the storage portion 303 is a circular cavity, and an inner diameter of the storage portion 303 is greater than an outer diameter of the stylus 100.

To prevent the stylus 100 from being dropped when placed in the storage portion 303. In an embodiment, a magnetic material may be arranged on an inner wall of the storage portion 303, and a magnetic material may be arranged in the stylus 100. The stylus 100 is adsorbed in the storage portion 303 by the magnetic adsorption between the magnetic materials. Certainly, in some embodiments, when the stylus 100 is fixed with the storage portion 303, including but not limited to, using magnetic adsorption to implement fixing. For example, the stylus 100 and the storage portion 303 may further be fixed in a manner of engagement.

To facilitate taking the stylus 100 out of the storage portion 303, an ejection structure may be arranged in the storage portion 303. For example, by pressing one end of the stylus 100, an ejection mechanism may drive one end of the stylus 100 to eject from the storage portion 303.

Next, a hardware structure of a stylus provided in this embodiment of this application is introduced.

Figure 6:
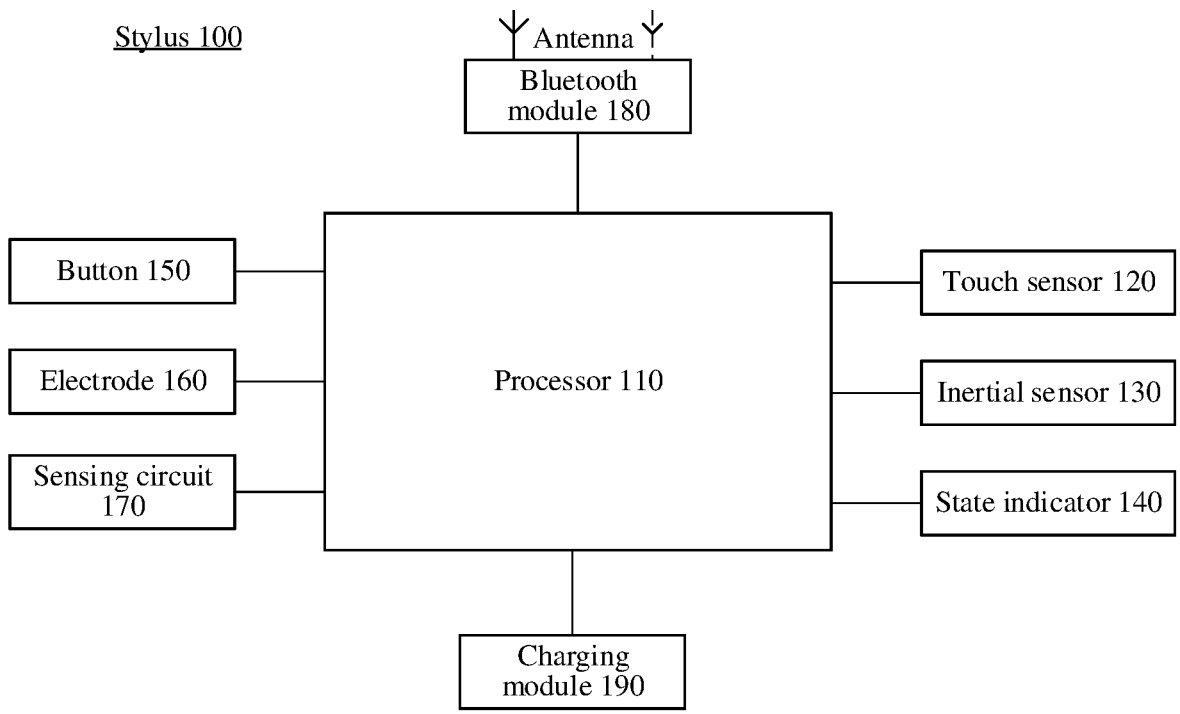
FIG. 6 is a schematic diagram of a hardware structure of a stylus according to an embodiment of this application.

FIG. 6 exemplarily shows a schematic diagram of a hardware structure of a stylus 100 according to an embodiment of this application.

As shown in FIG. 6, the stylus 100 may include a processor 110, one or more sensors (for example, touch sensor 120, inertial sensor 130, or the like), a state indicator 140, a button 150, an electrode 160, a sensing circuit 170, a Bluetooth module 180, a charging module 190, or the like.

The processor 110 may include a storage and processing circuit configured to support an operation of the stylus 100. The storage and processing circuit may include a storage device (for example, a flash memory or another electrically programmable read-only memory configured as a solid state drive) such as a non-volatile memory, a volatile memory (for example, static or dynamic random access memory), or the like. A processing circuit in the processor 110 may be configured to control an operation of the stylus 100. The processing circuit may be based on one or more microprocessors, microcontrollers, digital signal processors, baseband processors, power supply management units, audio chips, application specific integrated circuits, or the like.

The touch sensor 120 may be configured to detect a touch operation performed on or near the touch sensor 44.

The inertial sensor 130 may include a three-axis accelerometer and a six-axis gyroscope, and/or another component configured to measure movement of the stylus 100. For example, a three-axis magnetometer may be included in the sensor in the configuration of a nine-axis inertial sensor. In a process of the subsequent embodiments, when the stylus 100 moves, the inertial sensor 130 (for example, a six-axis gyroscope) may detect and obtain position information of the stylus 100 when the stylus 100 moves. The gyroscope sensor (for example, the six-axis gyroscope) may also be configured to determine a motion posture of the stylus 100. In some embodiments, the stylus 100 may determine the angular velocity of the stylus 100 around three axes (that is, an x axis, a y axis, and a z axis) through the gyroscope sensor. An acceleration sensor (for example, the three-axis accelerometer) may be configured to detect a magnitude of the acceleration of the stylus 100 in various directions (generally an x axis, a y axis, and a z axis). When the stylus 100 is stationary, a magnitude and a direction of a gravity may be detected.

The sensors may also include additional sensors, such as a temperature sensor, an ambient light sensor, a light-based proximity sensor, a contact sensor, a magnetic sensor, a pressure sensor, and/or another sensor.

The state indicator 140 may include diodes. The state indicator 140 is configured to prompt the user of a state of the stylus 100.

The button 150 may include a mechanical button and a non-mechanical button, and the button 150 may be configured to collect button pressing information from the user.

The stylus 100 may include one or more electrodes 160 (for details, reference may be made to the description in FIG. 2B), where one electrode 160 may be located at the writing end of the stylus 100, one electrode 160 may be located in the pen tip 10, and reference may be made to the related descriptions.

The sensing circuit 170 may sense capacitive coupling that is located between the electrode 160 and a drive line of a capacitive touch sensor panel that interacts with the stylus 100. The sensing circuit 170 may include an amplifier configured to receive a capacitance reading from the capacitive touch sensor panel, a clock configured to generate a demodulation signal, a phase shifter configured to generate a phase shifted demodulation signal, a mixer configured to demodulate the capacitance reading by using an in-phase demodulation frequency component, a mixer configured to demodulate the capacitance reading by using a quadrature demodulation frequency component, or the like. A result of performing demodulation by the mixer may be configured to determine an amplitude proportional to a capacitance, so that the stylus 100 may sense contact with the capacitive touch sensor panel.

To support wireless communication between the stylus 100 and the electronic device 200, the stylus 100 may include a wireless module. In FIG. 6, a description is made by using the wireless module as the Bluetooth module 180 as an example. The wireless module may further be a WI-FI hotspot module, a WI-FI peer-to-peer module, or the like. The Bluetooth module 180 may include a radio frequency transceiver, such as a transceiver. The Bluetooth module 180 may also include one or more antennas. The transceiver may transmit and/or receive a wireless signal by using the antenna. The wireless signals may be a Bluetooth signal, a wireless local area network signal, a long-range signal such as a cellular telephone signal, a near field communication signal, or another wireless signal based on a type of the wireless module.

The charging module 190 may support the charging of the stylus 100 and provide power for the stylus 100.

It may be understood that the stylus 100 may include a microphone, a speaker, an audio generator, a vibrator, a camera, a data port, and another device according to an actual requirement. The user may control the operation of the stylus 100 and the electronic device 200 that interacts with the stylus 100 by providing commands by using these devices, and receive state information and other output.

Next, a hardware structure of an electronic device provided in this embodiment of this application is introduced.

Figure 7:
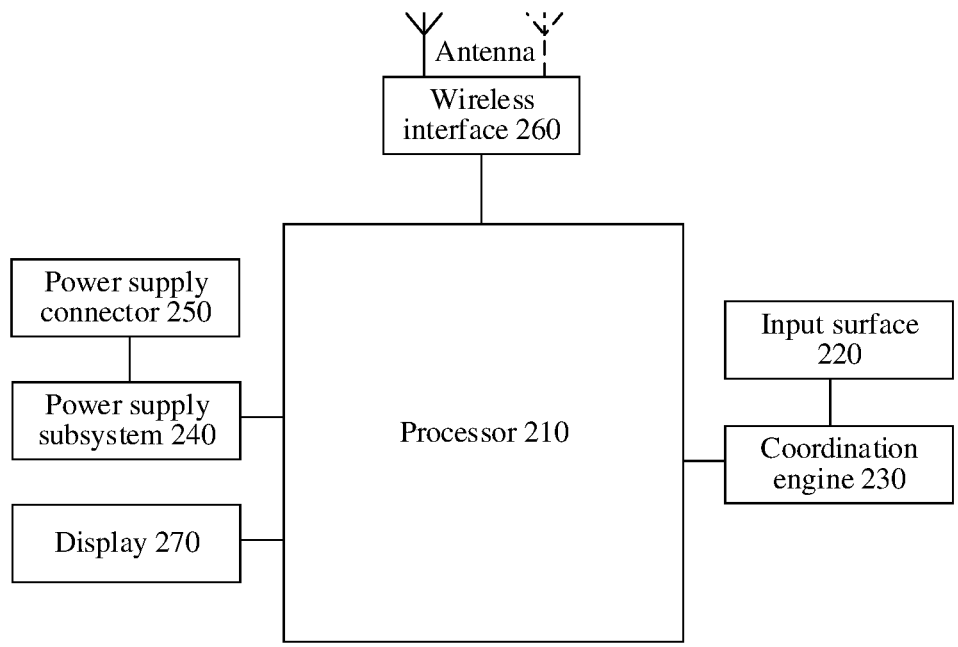
FIG. 7 is a schematic diagram of a hardware structure of an electronic device according to an embodiment of this application.

FIG. 7 exemplarily shows a schematic diagram of a hardware structure of an electronic device 200 according to an embodiment of this application.

As shown in FIG. 7, the electronic device 200 may include a plurality of subsystems. The plurality of subsystems cooperate to perform, coordinate, or monitor one or more operations or functions of the electronic device 200. The electronic device 200 includes a processor 210, an input surface 220, a coordination engine 230, a power supply subsystem 240, a power supply connector 250, a wireless interface 260, and a display 270.

For example, the coordination engine 230 may be configured to communicate and/or process data with another subsystem of the electronic device 200; perform communication and/or data transaction with the stylus 100; measure and/or obtain the output of one or more analog or digital sensors (such as touch sensors); measure and/or obtain the output of one or more sensor nodes of an array of sensor nodes (such as an array of capacitive sensing nodes); receive and locate a tip signal and a ring signal from the stylus 100; and locate the stylus 100 based on positions of a tip signal intersection region and a ring signal intersection region.

A coordination engine 230 of the electronic device 200 includes or is communicatively coupled to a sensor layer below the input surface 220 or integrated with the input surface in other manners. The coordination engine 230 positions the stylus 100 on the input surface 220 by using the sensor layer and estimates an angular position of the stylus 100 relative to a plane of the input surface 220 by using the technology described herein. In an embodiment, the input surface 220 may be referred to as touch control screen 201.

For example, the sensor layer of the coordination engine 230 of the electronic device 200 is a grid of capacitive sensing nodes arranged in columns and rows. More specifically, an array of column traces is arranged perpendicular to an array of row traces. The sensor layer may be separate from other layers of the electronic device, or the sensor layer may be directly arranged on another layer, such as, but not limited to: a display stack layer, a force sensor layer, a digitizer layer, a polarizer layer, a battery layer, a structural or decorative housing layer, or the like.

The sensor layer may operate in a plurality of modes. If the sensor layer operates in mutual capacitance mode, the column traces and the row traces form a single capacitive sensing node at each overlapping point (for example, "vertical" mutual capacitance). If the sensor layer operates in a self-capacitance mode, the column traces and the row traces form two (vertically aligned) capacitive sensing nodes at each overlapping point. In another implementation, if the sensor layer operates in a mutual capacitance mode, adjacent column traces and/or adjacent row traces may each form a single capacitive sensing node (for example, "horizontal" mutual capacitance). As described above, the sensor layer may detect the existence of the pen tip 10 of the stylus 100 and/or the touch of a finger of the user by monitoring a change in capacitance (for example, mutual capacitance or self-capacitance) presented at each capacitive sensing node. In many cases, the coordination engine 230 may be configured to detect the tip signal and the ring signal received from the stylus 100 through the sensor layer via capacitive coupling.

The tip signal and/or the ring signal may include specific information and/or data that may be configured to cause the electronic device 200 to identify the stylus 100. The type of information is generally referred to herein as "stylus identity" information. The information and/or data may be received by the sensor layer and interpreted, decoded and/or demodulated by the coordination engine 230.

The processor 210 may simultaneously receive input from more than one stylus by using the stylus identity information. Specifically, the coordination engine 230 may be configured to transmit the position and/or angular position of each of a plurality of styluses detected by the coordination engine 230 to the processor 210. In other cases, the coordination engine 230 may further transmit information related to relative positions and/or relative angular positions of the plurality of styluses detected by the coordination engine 230 to the processor 210. For example, the coordination engine 230 may notify the processor 210 that the detected first stylus is located at a position of the detected second stylus.

In other cases, the tip signal and/or the ring signal may further include specific information and/or data used for causing the electronic device 200 to identify a specific user. The type of information is generally referred to herein as "user identity" information.

The coordination engine 230 may forward the user identity information (if detected and/or recoverable) to the processor 210. If the user identify information cannot be recovered from the tip signal and/or the ring signal, the coordination engine 230 may optionally indicate to the processor 210 that user identify information is not available. The processor 210 may use the user identity information (or a case of the absence of the information) in any suitable manner, including but not limited to: accepting or denying an input from a specific user, and allowing or denying access to a specific function of the electronic device, or the like. The processor 210 may simultaneously receive inputs from more than one user by using the user identity information.

In other cases, the tip signal and/or the ring signal may include specific information and/or data that may be configured to cause the electronic device 200 to identify settings or preferences of the user or the stylus 100. The type of information is generally referred to herein as "stylus setting" information.

The coordination engine 230 may forward the stylus setting information (if detected and/or recoverable) to the processor 210. If the stylus setting information cannot be recovered from the tip signal and/or the ring signal, the coordination engine 230 may optionally indicate to the processor 210 that stylus setting information is not available. The electronic device 200 may set the information (or a case of the absence of the information) by using the stylus in any suitable manner, including but not limited to: applying settings to the electronic device, applying settings to a program running on the electronic device, changing the thickness, color, and pattern of lines presented by a graphics program on the electronic device, changing settings of a video game operated on the electronic device, or the like.

Generally, the processor 210 may be configured to perform, coordinate, and/or manage functions of the electronic device 200. The type of functions may include, but is not limited to, performing communication and/or data transaction with other subsystems of the electronic device 200, performing communication and/or data transaction with the stylus 100, performing data communication and/or data transaction through a wireless interface, performing data communication and/or data transaction through a wired interface, facilitating the exchange of power through a wireless (for example, inductive, resonant, or the like) or wired interface, receiving the position and angular position of one or more styluses, or the like.

The processor 210 may be implemented as any electronic device capable of processing, receiving or sending data or instructions. For example, the processor may be a microprocessor, a central processing unit, an application specific integrated circuit, a field-programmable gate array, a digital signal processor, an analog circuit, a digital circuit, or a combination of these devices. The processor may be a single-threading processor or a multi-threading processor. The processor may be a single-core processor or a multi-core processor.

During use, the processor 210 may be configured to access a memory in which instructions are stored. The instructions may be configured to cause the processor to perform, coordinate, or monitor one or more operations or functions of the electronic device 200.

The instructions stored in the memory may be configured to control or coordinate operations of other components of the electronic device 200. The components are such as, but not limited to: another processor, an analog or digital circuit, a volatile or non-volatile memory module, a display, a speaker, a microphone, a rotary input device, a button or another physical input device, a biometric authentication sensor and/or system, a force or touch input/output component, a communication module (such as a wireless interface and/or a power supply connector), and/or a haptic feedback device.

The memory may further store electronic data that may be used by the stylus or the processor. For example, the memory may store electronic data or content (such as media files, documents, and applications), device settings and preferences, a timing signal, a control signal, or data, data structures, or databases applied in various modules, and files or configurations related to detecting the tip signal and/or the ring signal, or the like. The memory may be configured as any type of memory. For example, the memory may be implemented as a random access memory, a read-only memory, a flash memory, a removable memory, another type of storage element, or a combination of the type of device.

The electronic device 200 further includes a power supply subsystem 240. The power supply subsystem 240 may include a battery or another power supply. The power supply subsystem 240 may be configured to supply power to the electronic device 200. The power supply subsystem 240 may further be coupled to a power supply connector 250. The power supply connector 250 may be any suitable connector or port, and the power supply connector 250 may be configured to receive power from an external power supply and/or configured to supply power to an external load. For example, in some implementations, the power supply connector 250 may be configured to recharge a battery in the power supply subsystem 240. In another implementation, the power supply connector 250 may be configured to transmit power stored (or available to) in the power supply subsystem 240 to the stylus 100.

The electronic device 200 further includes a wireless interface 260 to facilitate electronic communication between the electronic device 200 and the stylus 100. In an implementation, the electronic device 200 may be configured to communicate with the stylus 100 via a low energy Bluetooth communication interface or a near field communication interface. In other examples, the communication interface facilitates electronic communication between the electronic device 200 and an external communication network, device, or platform.

The wireless interface 260 (whether a communication interface between the electronic device 200 and the stylus 100 or another communication interface) may be implemented as one or more wireless interfaces, Bluetooth interfaces, near field communication interfaces, magnetic interfaces, universal serial bus interfaces, inductive interfaces, resonant interfaces, capacitive coupling interfaces, Wi-Fi interfaces, TCP/IP interfaces, network communication interfaces, optical interfaces, acoustic interfaces, or any conventional communication interface.

The electronic device 200 further includes a display 270. The display 270 may be located behind the input surface 220, or may be integrated with the input surface 220. The display 270 may be communicatively coupled to the processor 210. The processor 210 may present information to the user by using the display 270. In many cases, the processor 210 presents an interface with which the user may interact by using the display 270. In many cases, the user manipulates the stylus 100 to interact with the interface.

It is obvious to a person skilled in the art that some specific details presented above related to the electronic device 200 may not be required to practice particular implementations or their equivalents. Similarly, other electronic devices may include a greater quantity of subsystems, modules, components, or the like. In proper cases, some sub-modules may be implemented as software or hardware. Therefore, it is to be understood that the foregoing description is not intended to be exhaustive or to limit the present disclosure to the precise form described herein. On the contrary, it is obvious to a person of ordinary skill in the art that many modifications and variations are possible according to the foregoing teachings.

Next, a hardware structure of a wireless keyboard provided in this embodiment of this application is introduced.

Figure 8:
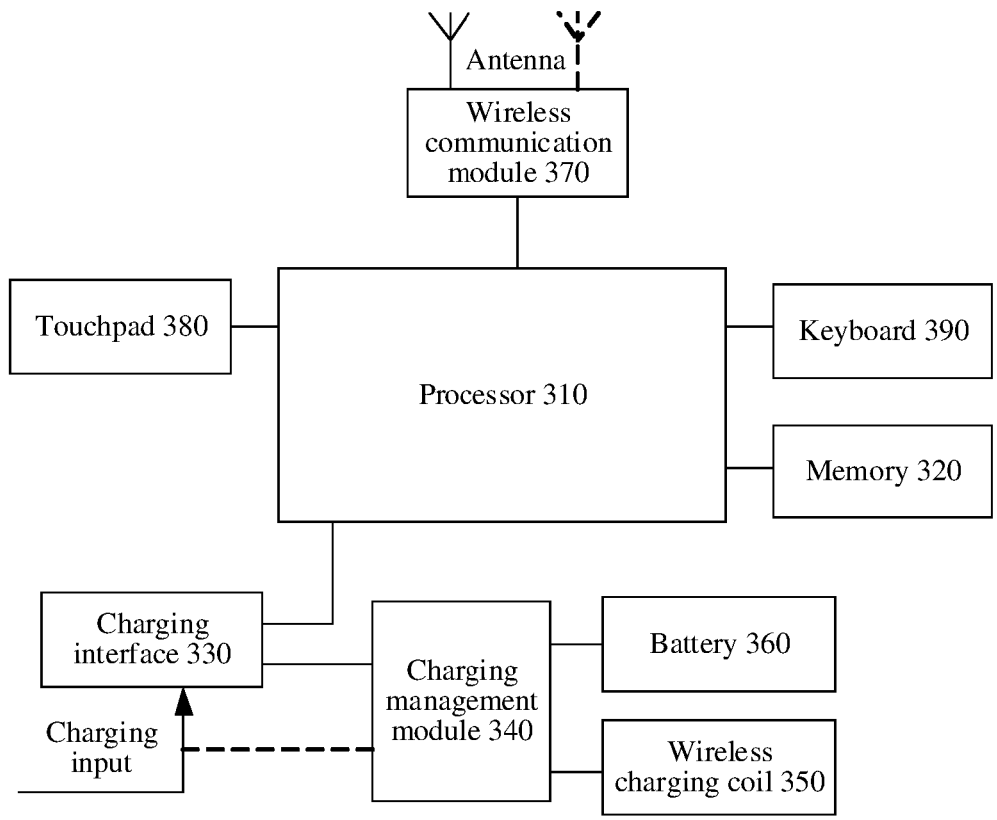
FIG. 8 is a schematic diagram of a hardware structure of a wireless keyboard according to an embodiment of this application.

FIG. 8 exemplarily shows a schematic diagram of a hardware structure of a wireless keyboard 300 according to an embodiment of this application.

The wireless keyboard 300 may include a processor 310, a memory 320, a charging interface 330, a charging management module 340, a wireless charging coil 350, a battery 360, a wireless communication module 370, a touchpad 380, and a keyboard 390.

The processor 310, the memory 320, the charging interface 330, the charging management module 340, the battery 360, the wireless communication module 370, the touchpad 380, the keyboard 390, and the like may all be arranged on a keyboard body (that is, the second part 302 shown in FIG. 1) of the wireless keyboard 300. The wireless charging coil 350 may be arranged in a connection portion 304 (as shown in FIG. 4) for movably connecting the keyboard body and the holder. It may be understood that the schematic structure in this embodiment constitutes no specific limitation on the wireless keyboard 300. In some other embodiments, the wireless keyboard 300 may include more or fewer components than those shown in the figure, or some components may be combined, or some components may be divided, or a different component deployment may be used. The components shown in the figure may be implemented by hardware, software, or a combination of software and hardware.

The memory 320 may be configured to store program code, for example, program code used for wirelessly charging the stylus 100. The memory 320 may further store a Bluetooth address used for uniquely identifying the wireless keyboard 300. In addition, the memory 320 may further store connection data of an electronic device that has been successfully paired with the wireless keyboard 300 before. For example, the connection data may be a Bluetooth address of an electronic device that has been successfully paired with the wireless keyboard 300. Based on the connection data, the wireless keyboard 300 may be automatically paired with the electronic device, and it is unnecessary to configure a connection to the electronic device, for example, perform validity verification. The foregoing Bluetooth address may be a media access control (media access control, MAC) address.

The processor 310 may be configured to execute the foregoing application program code, and invoke related modules to implement functions of the wireless keyboard 300 in the embodiments of this application, for example, implement the wired charging function, the reverse wireless charging function, and the wireless communication function of the wireless keyboard 300. The processor 310 may include one or more processing units. Different processing units may be independent devices, or may be integrated into one or more processors 310. The processor 310 may be specifically an integrated control chip, or may be formed by a circuit including various active and/or passive components, and the circuit is configured to perform the functions of the processor 310 described in this embodiment of this application. The processor of the wireless keyboard 300 may be a microprocessor.

The wireless communication module 370 may be configured to support data exchange of wireless communication between the wireless keyboard 300 and other electronic devices, including Bluetooth (bluetooth, BT), a global navigation satellite system (global navigation satellite system, GNSS), a wireless local area network (wireless local area network, WLAN) (for example, a wireless fidelity (wireless fidelity, Wi-Fi) network), frequency modulation (frequency modulation, FM), near field communication (near field communication, NFC), an infrared (infrared, IR) technology, and the like.

In some embodiments, the wireless communication module 370 may be a Bluetooth chip. The wireless keyboard 300 may be a Bluetooth keyboard. The wireless keyboard 300 may pair with and establish a wireless connection to Bluetooth chips of other electronic devices through the Bluetooth chip, to implement wireless communication between the wireless keyboard 300 and other electronic devices through the wireless connection.

In addition, the wireless communication module 370 may further include an antenna. The wireless communication module 370 receives an electromagnetic wave through the antenna, performs frequency modulation and filtering processing on an electromagnetic wave signal, and sends a processed signal to the processor 310. The wireless communication module 370 may alternatively receive a to-be-sent signal from the processor 310, perform frequency modulation and amplification on the to-be-sent signal, and convert the signal into an electromagnetic wave for radiation by using the antenna.

In some embodiments, the wireless keyboard 300 may support wired charging. Specifically, the charging management module 340 may receive a charging input from the wired charger through the charging interface 330.

In some other embodiments, the wireless keyboard 300 may support forward wireless charging. The charging management module 340 may receive a wireless charging input through the wireless charging coil 350 of the wireless keyboard 300. Specifically, the charging management module 340 is connected with the wireless charging coil 350 by a matching circuit. The wireless charging coil 350 may be coupled with a wireless charging coil of a wireless charger, and induce an alternating electromagnetic field emitted by the wireless charging coil 350 of the wireless charger to generate an alternating current signal. The alternating current signal generated by the wireless charging coil 350 is transmitted to the charging management module 340 through the matching circuit, to wirelessly charge the battery 360.

The charging management module 340 may further supply power to the wireless keyboard 300 while charging the battery 360. The charging management module 340 receives an input of the battery 360, to supply power to the processor 310, the memory 320, an external memory, the wireless communication module 370, and the like. The charging management module 340 may be further configured to monitor parameters such as a battery capacity, a battery cycle count and a battery state of health (electric leakage and impedance) of the battery 360. In some other embodiments, the charging management module 340 may be disposed in the processor 310.

In some other embodiments, the wireless keyboard 300 may support reverse wireless charging. Specifically, the charging management module 340 may further receive an input from the charging interface 330 or the battery 360, and convert a direct current signal inputted from the charging interface 330 or the battery 360 into an alternating current signal. The alternating current signal is transmitted to the wireless charging coil 350 through the matching circuit. The wireless charging coil 350 may generate an alternating electromagnetic field upon receiving the alternating current signal. A wireless charging coil of another mobile terminal may perform wireless charging by sensing the alternating electromagnetic field. That is, the wireless keyboard 300 may further wirelessly charge another mobile terminal. In an embodiment, the wireless charging coil 350 may be arranged in the storage portion 303 of the wireless keyboard 300, and a wireless charging coil is arranged in the pen holder 20 of the stylus 100. When the stylus 100 is placed in the storage portion 303, the wireless keyboard 300 may charge the stylus 100 through the wireless charging coil 350.

It should be noted that, the matching circuit may be integrated into the charging management module 340, and the matching circuit may alternatively be independent of the charging management module 340. This is not limited in the embodiments of this application. FIG. 8 is a schematic diagram of a hardware structure of the wireless keyboard 300 by using an example in which the matching circuit may be integrated in the charging management module 340.

The charging interface 330 may be configured to provide a wired connection for charging or communication between the wireless keyboard 300 and another electronic device (for example, a wired charger of the wireless keyboard 300).

The touchpad 380 is integrated with a touch sensor. The notebook computer may receive a control command of the user on the notebook computer through the touchpad 380 and the keyboard 390.

It may be understood that the schematic structure in this embodiment of this application constitutes no specific limit to the wireless keyboard 300. The tablet computer may include more or fewer components than those shown in FIG. 8, or two or more components may be combined, or a different component deployment may be used. For example, a receiving cavity for receiving the stylus 100 may be further arranged on a housing of the wireless keyboard 300. The wireless charging coil 350 is arranged in the receiving cavity, and is configured to wirelessly charge the stylus 100 after the stylus 100 is received in the receiving cavity.

In another example, the outer surface of the wireless keyboard 300 may further include components such as buttons, indicator lights (which may indicate states such as battery power, incoming/outgoing calls, and pairing modes), and a touch screen (which may prompt the user with related information). The key may be a physical key or a touch key (used in cooperation with a touch sensor), or the like, and is configured to trigger operations such as power-on, power-off, starting charging and stopping charging.

Next, with reference to a structure of the stylus 100, from a perspective of interaction between the stylus 100 and the electronic device 200, a function control method in this embodiment of this application is introduced.

Figure 9:
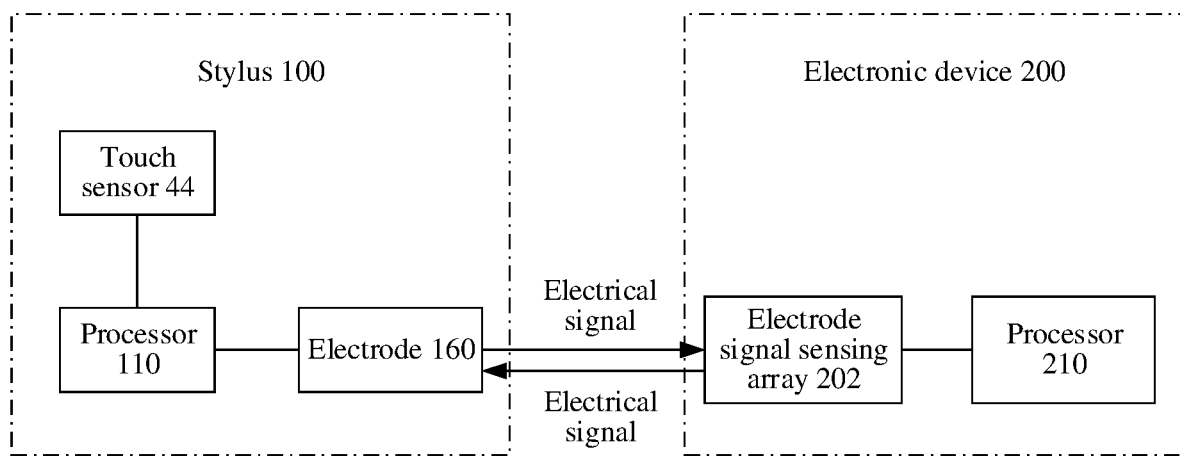
FIG. 9 is a schematic diagram of interaction between a stylus and an electronic device according to an embodiment of this application.

FIG. 9 exemplarily shows a schematic diagram of interaction between a stylus 100 and an electronic device 200 according to an embodiment of this application.

As shown in FIG. 9, the stylus 100 may include a touch sensor 44, a processor 110, and an electrode 160, and the electronic device 200 may include an electrode signal sensing array 202 and a processor 210. In an embodiment, the electrode signal sensing array 202 may be the coordination engine 230 in FIG. 7. In some other embodiments of this application, the stylus 100 and the electronic device 200 may include more or fewer components than those shown in the figure, or some components may be combined, or some components may be split, or components are arranged in different manners. The components shown in the figure may be implemented by hardware, software, or a combination of software and hardware.

The touch sensor 44 is configured to collect data of the touch operation performed by the user on the stylus.

When the user touches a sensing region of the touch sensor 44, the touch sensor 44 may collect operation data of the user, such as the quantity of times of touches, and/or touch positions, and/or touch gestures (for example, swiping touch and/or tapping touch), and/or touch durations, or the like, the touch sensor 44 may send the operation data of the user to the processor 110 in the stylus 100.

The processor 110 is configured to detect an operation action performed by the user based on the operation data of the user. For example, the operation data of the user is: the quantity of times of touches, and/or touch positions, and/or touch gestures (for example, swiping touch and/or tapping touch), and/or touch durations. The processor 110 may include: the quantity of times of touches, and/or touch positions, and/or touch gestures (for example, swiping touch and/or tapping touch), and/or touch durations, and a mapping relationship of the operation action performed by the user. The processor 110 may detect the operation action performed by the user based on the operation data of the user and the mapping relationship, so as to achieve the objective of detecting the operation action performed by the user by the stylus 100.

In this embodiment of this application, a process of how the processor 110 and the touch sensor 44 detect an action performed by the user is not repeated.

The electrode 160 may include a first emission electrode 41 and a second emission electrode 42. In this embodiment of this application, the processor 110 may be configured to send a downlink signal to the electronic device 200 through the electrode 160.

The electrode signal sensing array 202 may be integrated in the touch screen of the electronic device 200 to receive a signal from the electrode 160 (for example, the downlink signal as described above, that is, an electrical signal). The electrode signal sensing array 202 may also be configured to send an uplink signal (that is, an electrical signal) to the electrode 160 in the stylus 100. The uplink signal may be used for performing function mode switching by the stylus 100. A method for the stylus 100 to perform function mode switching based on the uplink signal is described in detail in subsequent embodiments, and is not repeated herein.

The processor 210 is configured to perform a target function based on the signal received by the electrode signal sensing array 202, and for details, reference may be made to the description of the following embodiments.

Figure 10:
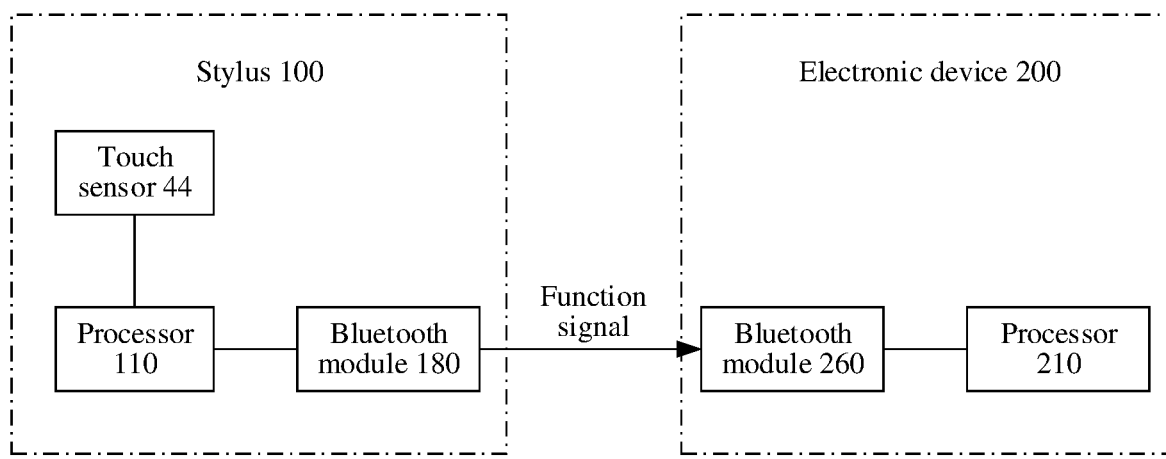
FIG. 10 is another schematic diagram of interaction between a stylus and an electronic device according to an embodiment of this application.

FIG. 10 exemplarily shows another schematic diagram of interaction between another stylus 100 and an electronic device 200 according to an embodiment of this application.

As shown in FIG. 10, the stylus 100 may include: a touch sensor 44, a processor 110, and a Bluetooth module 180, and the electronic device 200 may include: a processor 210 and a wireless interface 260. It is to be understood that the wireless interface 260 is represented by the Bluetooth module 260 in FIG. 10. In some other embodiments of this application, the stylus 100 and the electronic device 200 may include more or fewer components than those shown in the figure, or some components may be combined, or some components may be split, or components are arranged in different manners. The components shown in the figure may be implemented by hardware, software, or a combination of software and hardware. In FIG. 10 and the following embodiments, a description is made by using an example in which a wireless connection manner between the stylus 100 and the electronic device 200 is a Bluetooth connection. The wireless connection manner between the stylus 100 and the electronic device 200 may further be other types of connection manners, and reference may be made to the related descriptions of the foregoing embodiments.

The processor 110 may implement communication between the stylus 100 and the electronic device 200 based on the Bluetooth module 180 and the Bluetooth module 260 in the electronic device 200, such as sending a function signal to the electronic device 200.

The processor 210 is configured to receive the function signal from the stylus 100 based on the Bluetooth module 260, and perform the target function. For details, reference may be made to the descriptions in the following embodiments.

Currently, when the user performs operations (for example, tapping, writing, and erasing handwriting, or the like) on the electronic device 200 by using the stylus 100, the stylus 100 needs to be brought into contact with the touch screen on the electronic device 200. The stylus 100 may perform data exchange with the electronic device 200 based on the electrical signal, and in addition, the electronic device 200 may perform corresponding operations in response to the electrical signal sent by the stylus 100 according to changes in the capacitance value on the touch screen. However, in some application scenarios (for example, a screen mirroring scenario), the stylus 100 cannot send an electrical signal to the electronic device 200 at a long distance so that the stylus can perform a specified operation (for example, page turning operation, or the like) in response to the electrical signal. Therefore, the operation is very inconvenient.

Therefore, this embodiment of this application provides a function mode switching method.

The stylus 100 and the electronic device 200 establish a wireless communication connection. The stylus 100 may have a plurality of different function modes. The plurality of different function modes may include a first mode and a second mode. The stylus 100 may be switched between the first mode and the second mode.

In a possible implementation, the stylus 100 may detect a specified switching operation 1 performed on the stylus 100 by the user. The stylus 100 may perform function mode switching (for example, switch from the first mode to the second mode, or switch from the second mode to the first mode) in response to the specified switching operation 1. The specified operation 1 may be, for example, a multi-touch operation on a region of the touch sensor 44 (for example, continuously touching the region of the touch sensor 44 on the stylus 100 three times), a long-pressing operation on the region of the touch sensor 44, or the like. This is not limited in this application.

In a possible implementation, the stylus 100 may also detect strength of the specified signal 1 (for example, the uplink signal in the foregoing description) sent by the electronic device 200. When it is detected that the strength of the specified signal 1 is less than a specified value 1 (for example, −50 dbm), the stylus 100 may perform function mode switching (for example, switch from the first mode to the second mode). When it is detected that the strength of the specified signal 1 is greater than a specified value 1 (for example, −50 dbm), the stylus 100 may also perform function mode switching (for example, switch from the second mode to the first mode). For example, the electrode 160 in the stylus 100 may receive the strength of the uplink signal sent by the electrode signal sensing array 202 in the touch screen of the electronic device 200. When the stylus 100 detects that a strength value of the uplink signal is less than −50 dbm, the stylus 100 may be switched from the first mode to the second mode.

In different function modes, when the stylus 100 receives the same operation performed on the stylus 100 by the user, the stylus 100 may correspond to different function signals.

For example, in the first mode, an input 1 corresponds to a function signal 1. The function signal 1 corresponds to a function 1. In the second mode, an input 1 corresponds to a function signal 5. The function signal 5 corresponds to a function 5. When the stylus 100 is in the first mode, the stylus 100 may come into contact with the touch screen in the electronic device 200. The stylus 100 may continuously send downlink signals to the electronic device 200, so that the electronic device 200 detects a position of the stylus 100 on the touch screen of the electronic device 200 and an inclination angle of the stylus 100. The downlink signal is configured to cause the electronic device 200 to perform a writing function and a tapping function. When the stylus 100 receives the input 1 (for example, double clicking) performed on the region of the touch sensor 44, the stylus 100 may obtain the function signal 1 corresponding to the input 1 in the first mode, and then send the function signal 1 to the electronic device 200, so that the electronic device 200 performs the corresponding function 1 in response to the function signal 1.

The stylus 100 may detect the strength of the electrical signal (for example, the uplink signal) sent by the touch screen in the electronic device 200. When the stylus 100 detects that the strength of the electrical signal is less than a specified value 1 (for example, −50 dbm), the stylus 100 may be switched from the first mode to the second mode.

When the stylus 100 is in the second mode, the stylus 100 may be within a specified range 1 (for example, 10 meters) from the electronic device 200. When the stylus 100 receives the input 1 (for example, double tapping) applied to the region of the touch sensor 44, the stylus 100 may obtain the function signal 5 corresponding to the input 1 in the second mode, and then send the function signal 5 to the electronic device 200, so that the electronic device 200 performs the corresponding function 5 in response to the function signal 5.

It may be seen from the method that, in some application scenarios, the stylus 100 may perform function mode switching in response to a specified switching operation 1 or detecting a specified signal 1 whose strength is less than a specified value 1. A stylus 100 may send different function signals to the electronic device 200 in response to a received input based on different function modes, so that the electronic device 200 performs a corresponding function in response to the function signal. Therefore, the operation is very convenient, and the stylus 100 may be applied in a wider range of scenarios.

Figure 11A:
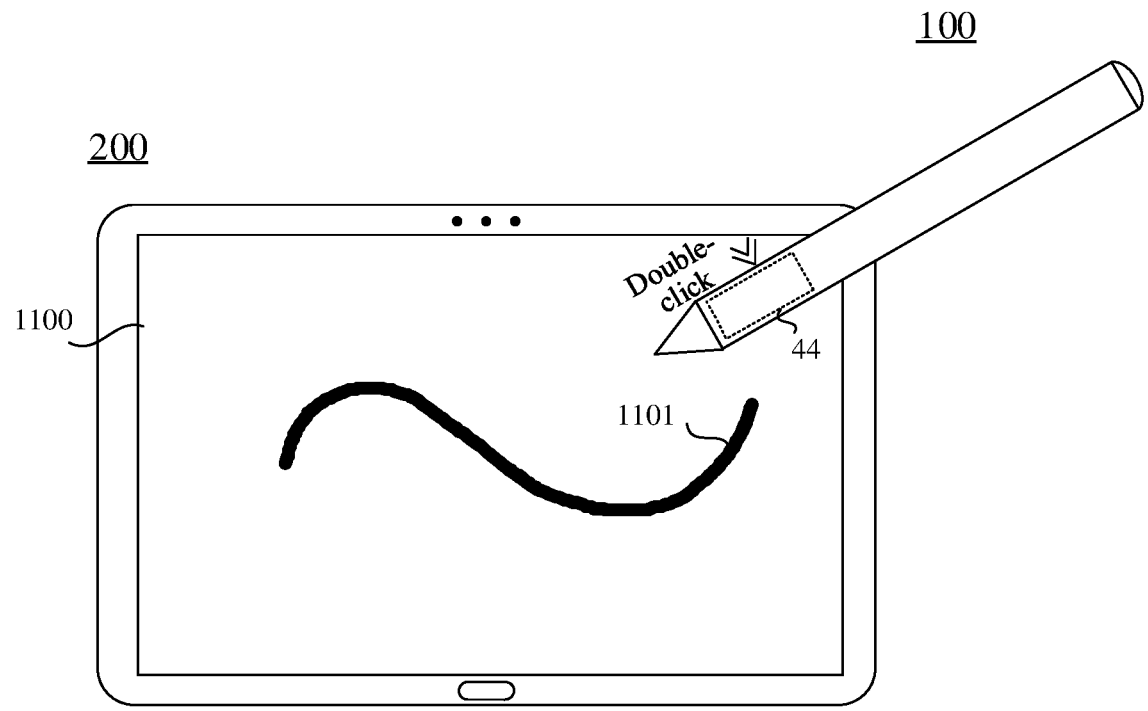
FIG. 11A to FIG. 11T are application scenarios of a function mode switching method according to an embodiment of this application.
Figure 11B:
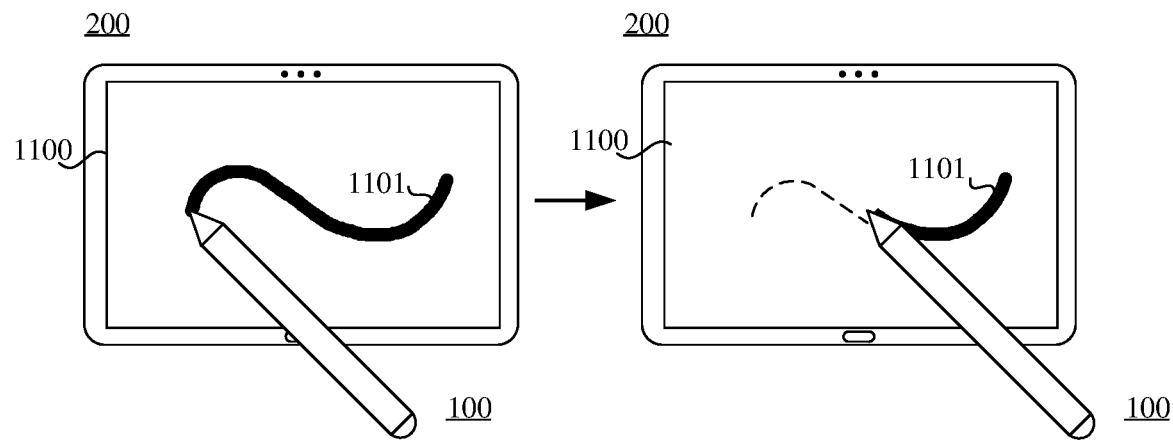
Figure 11C:
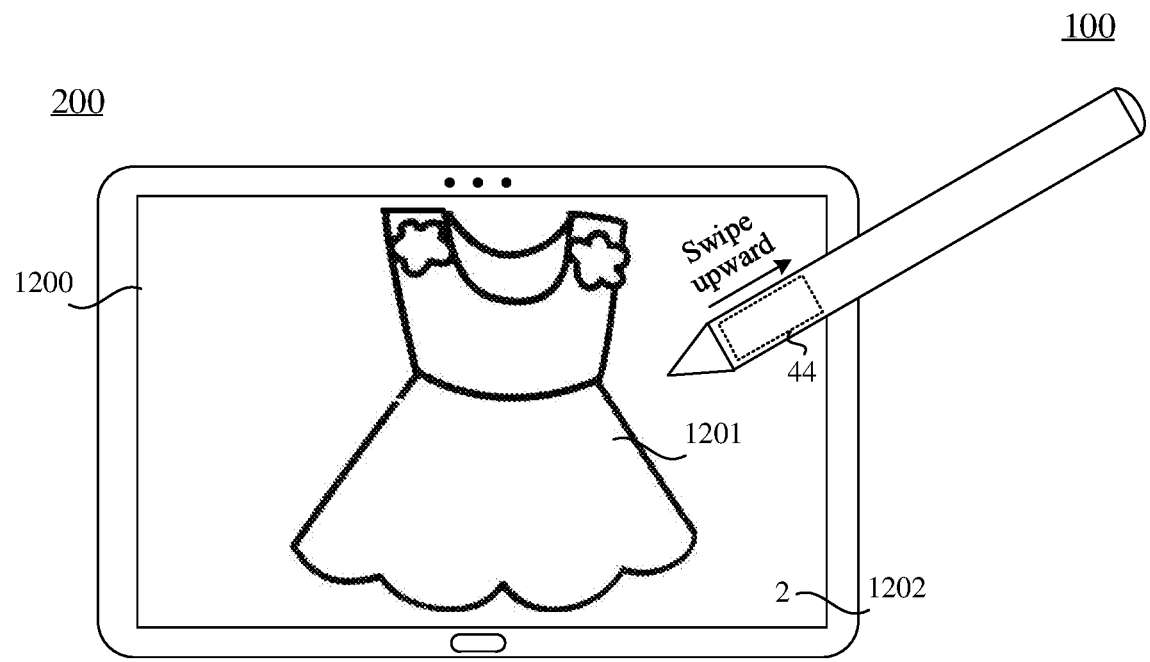
Figure 11D:
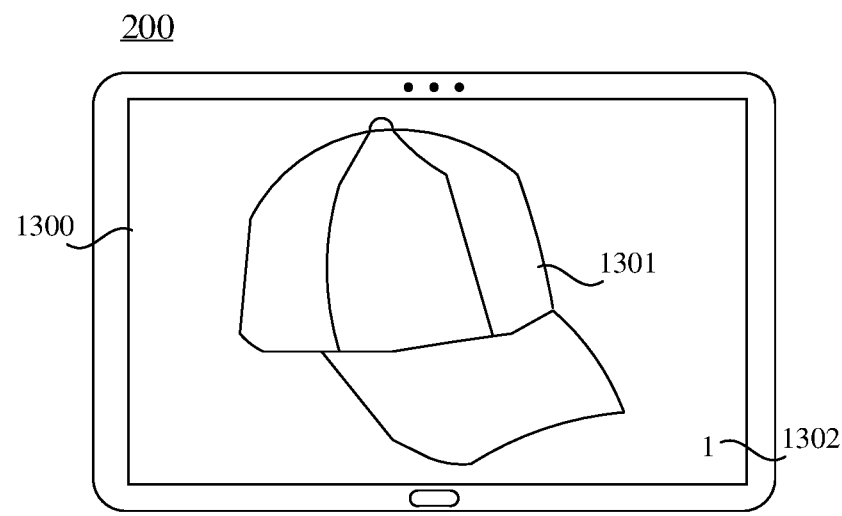
Figure 11E:
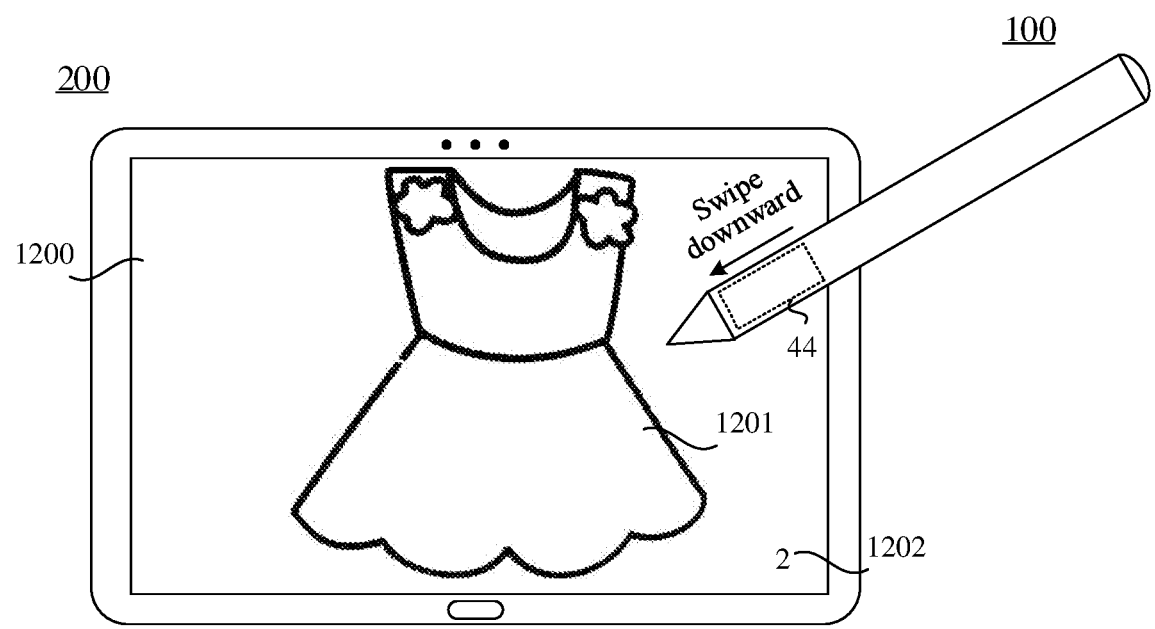
Figure 11F:
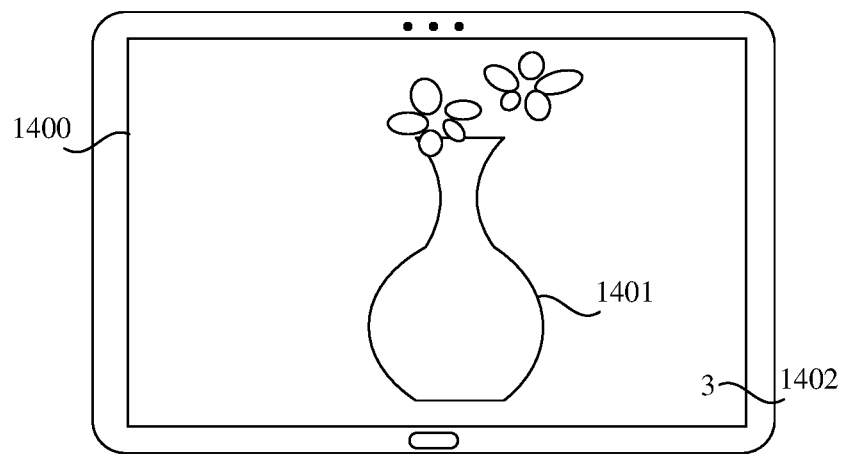
Figure 11G:
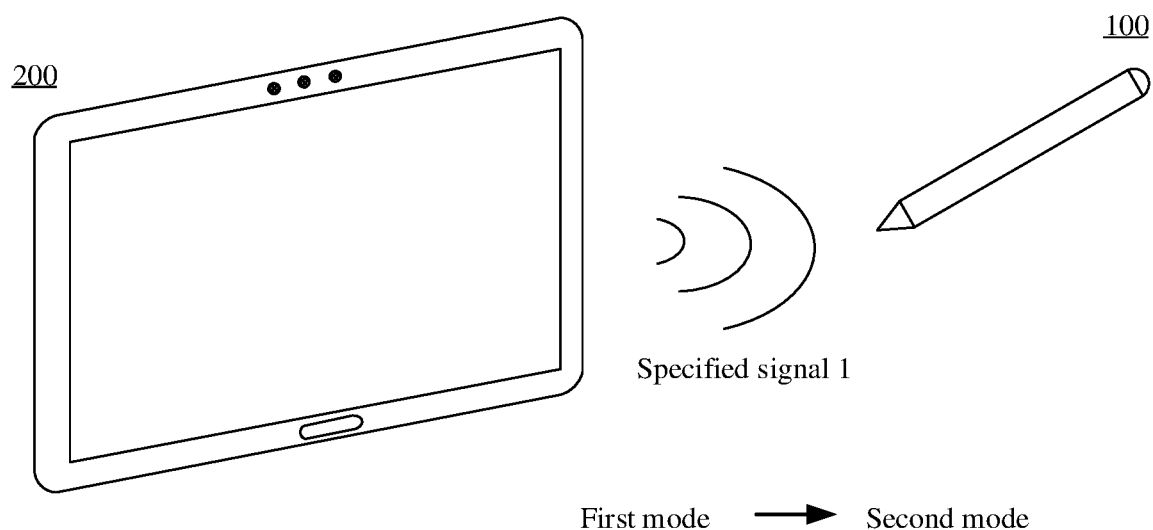
Figure 11H:
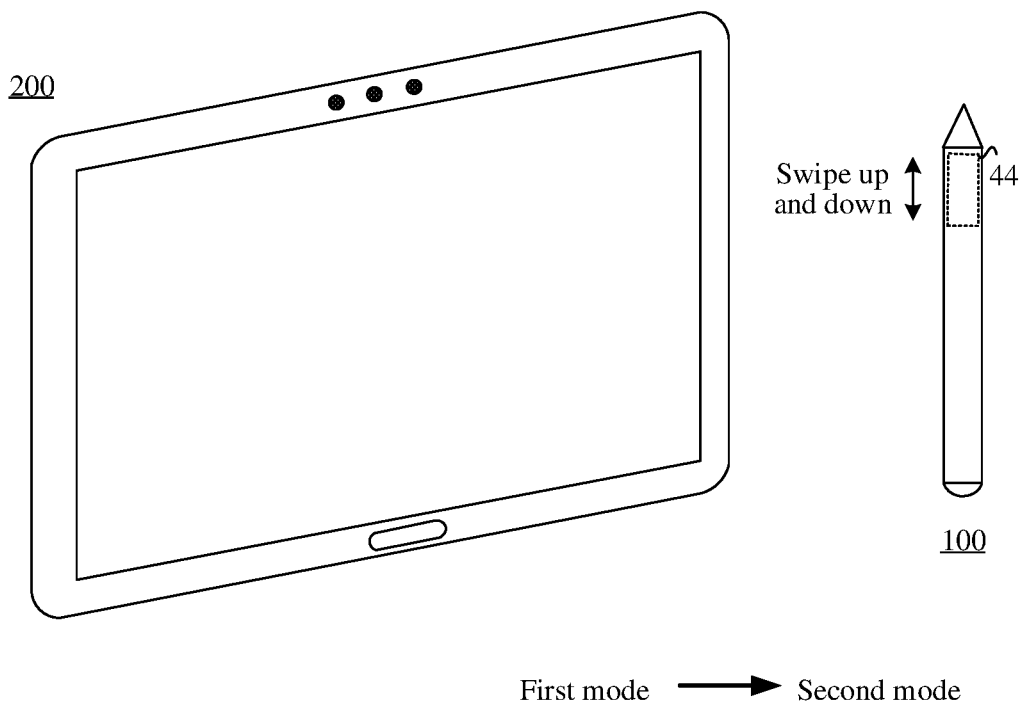
Figure 11I:
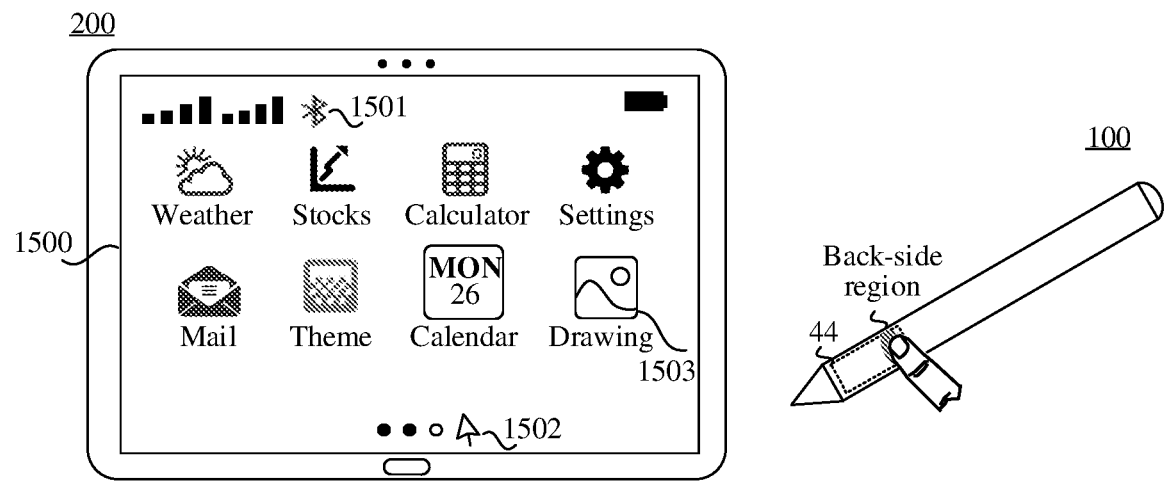
Figure 11J:
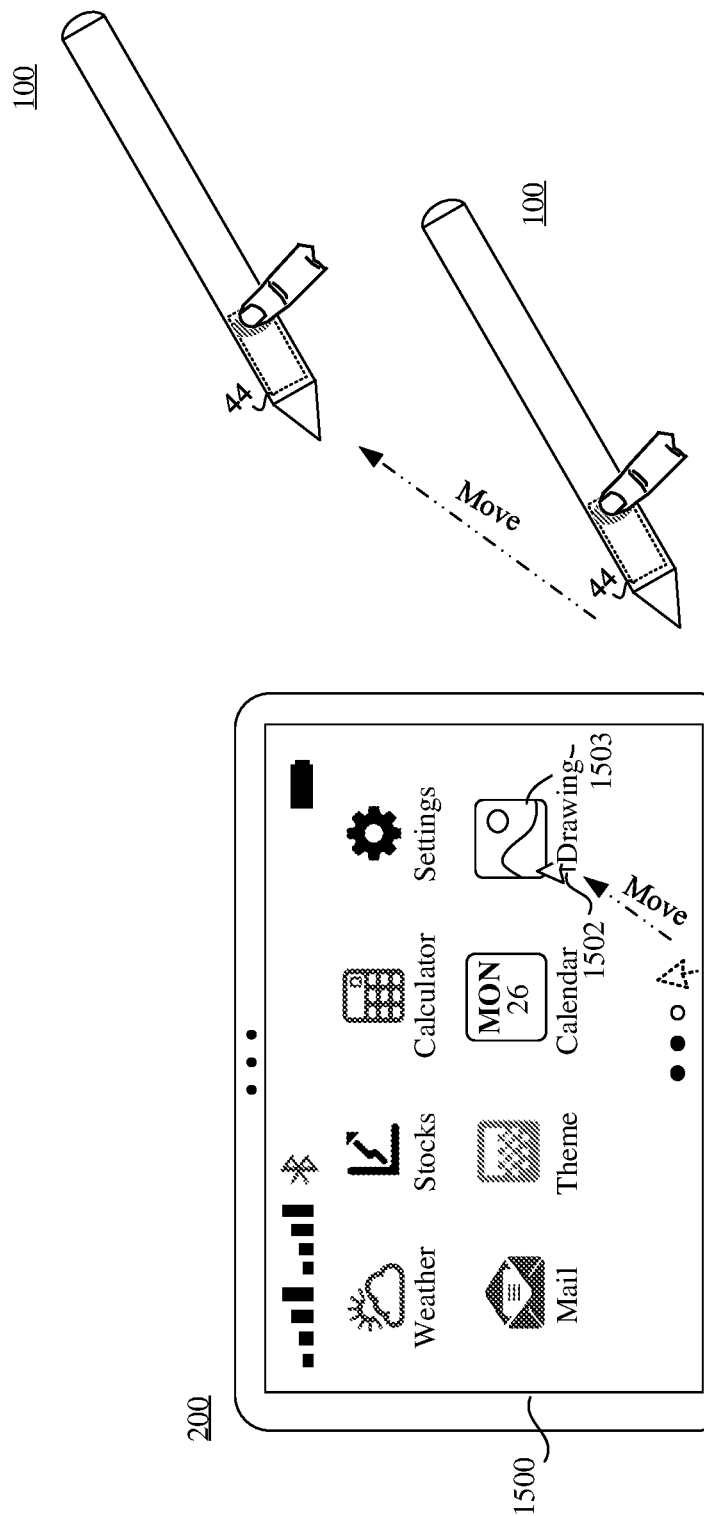
Figure 11K:
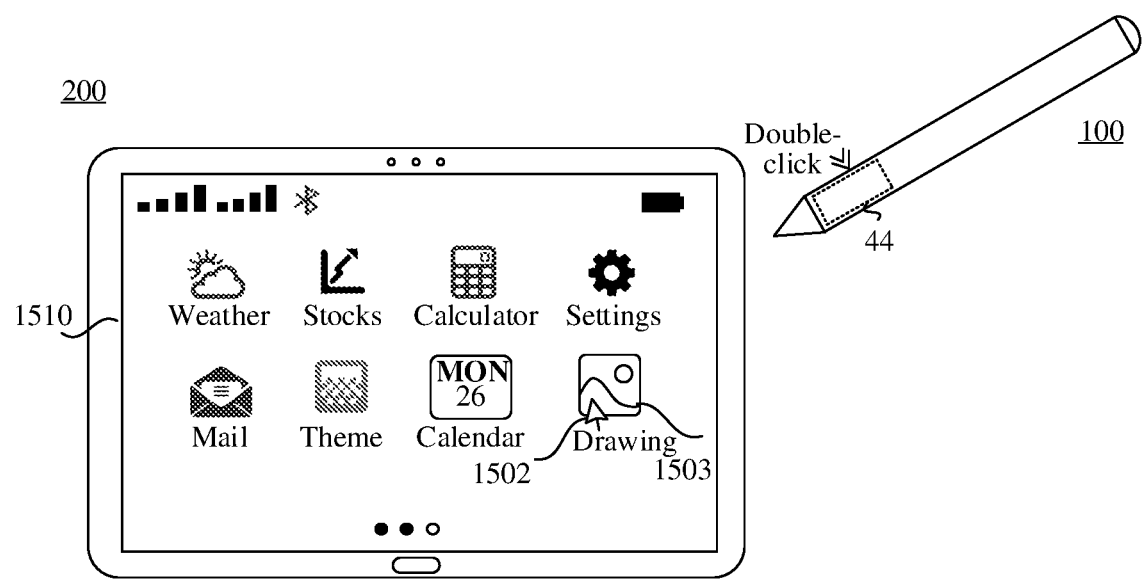
Figure 11L:
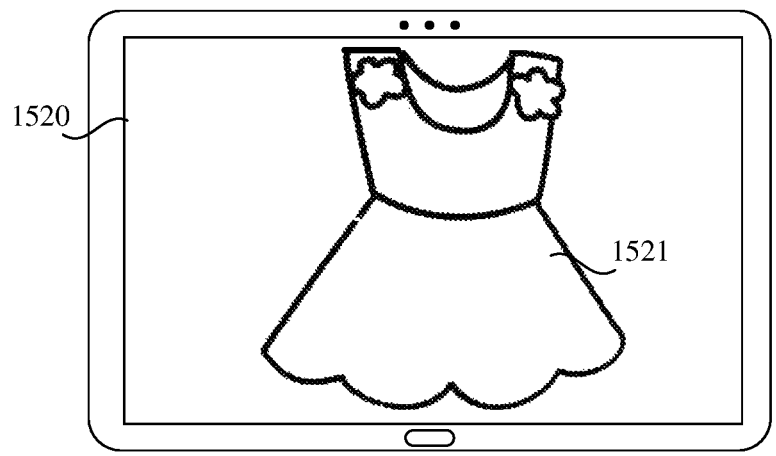
Figure 11M:
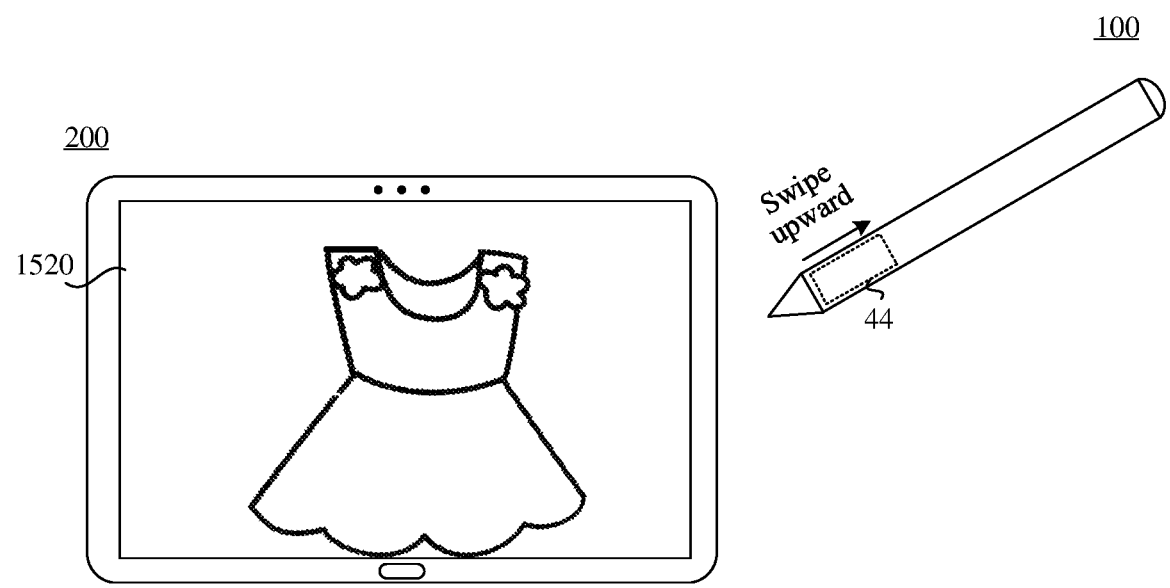
Figure 11N:
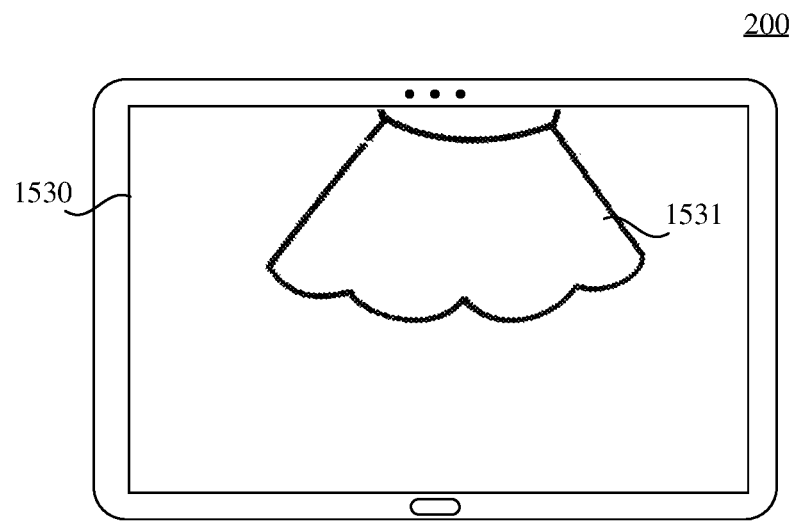
Figure 11O:
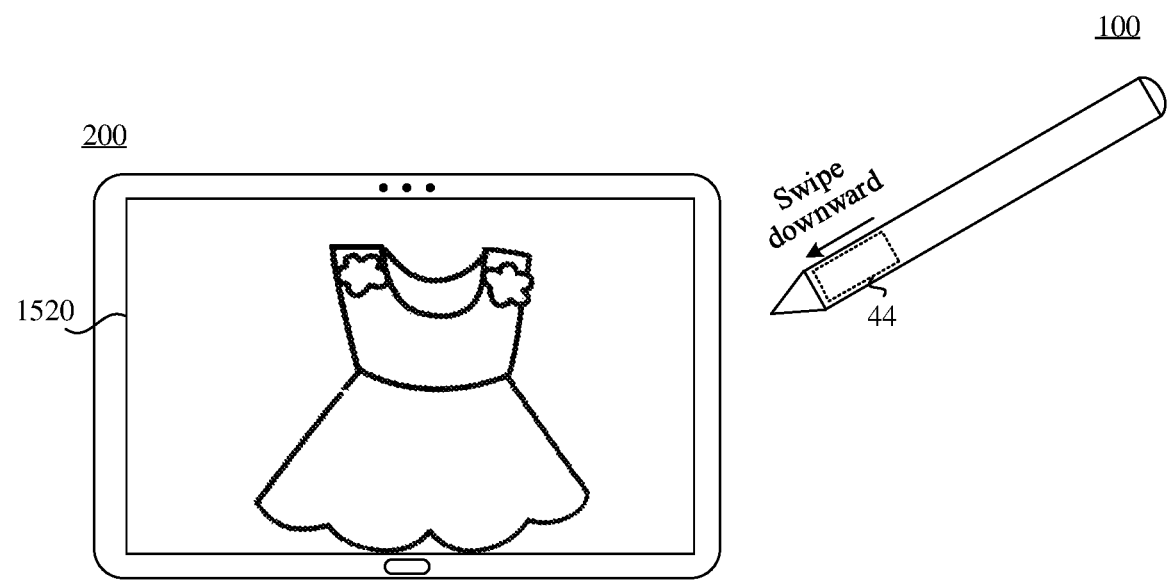
Figure 11P:
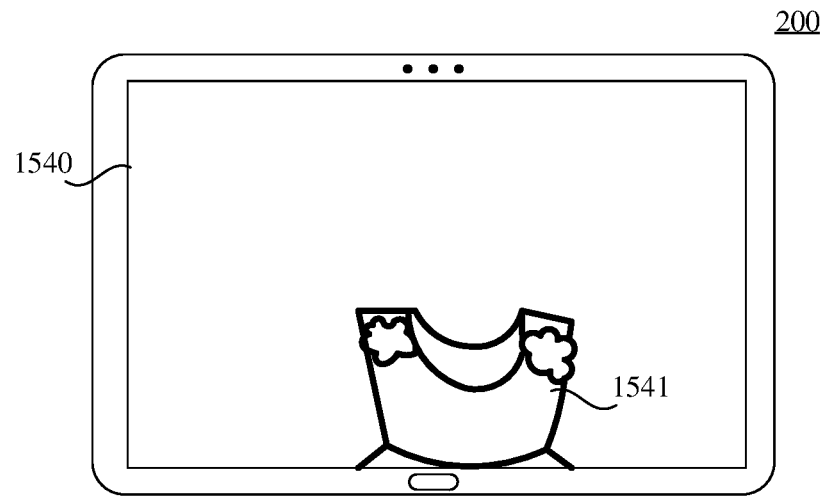
Figure 11Q:
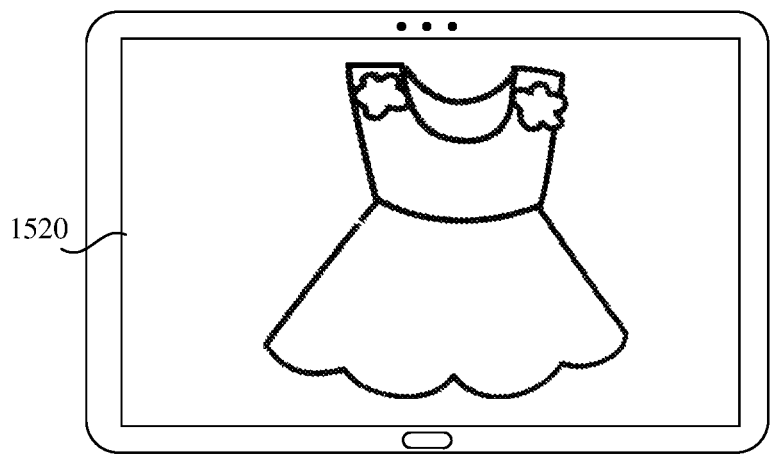
Figure 11Q:
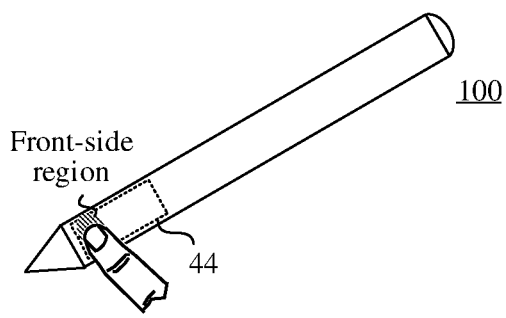
Figure 11R:
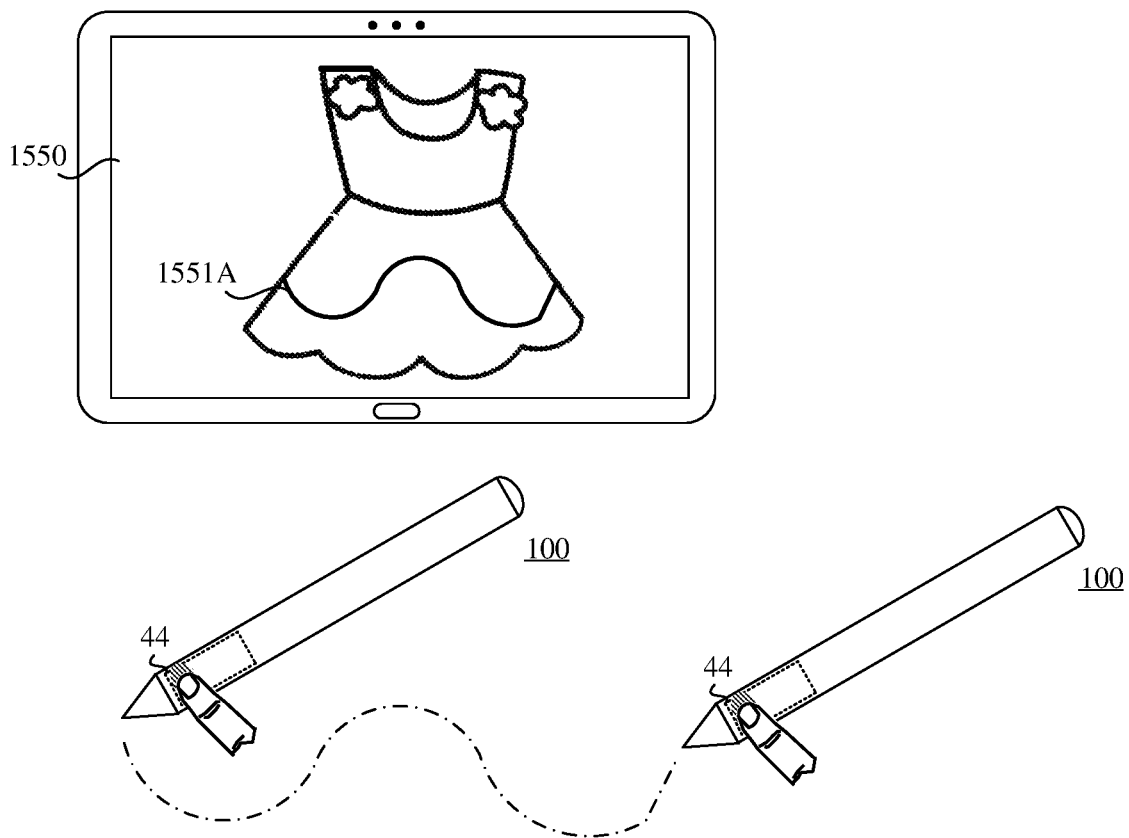
Figure 11S:
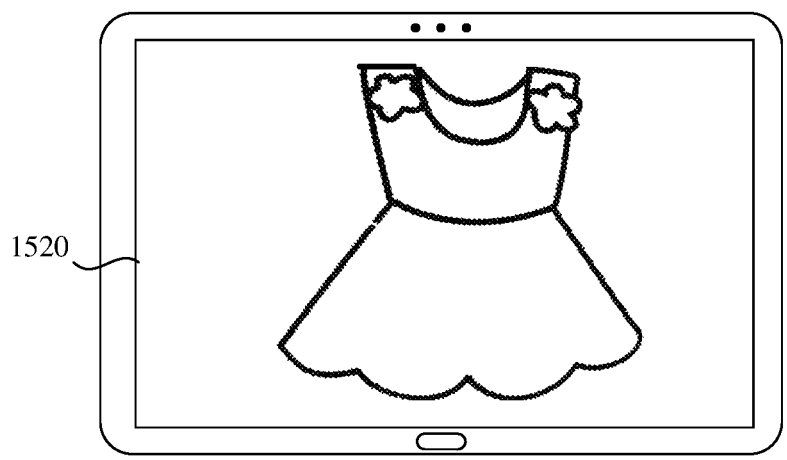
Figure 11S:
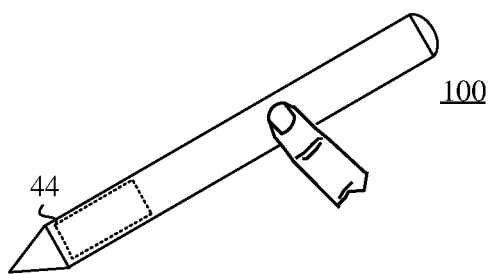
Figure 11T:
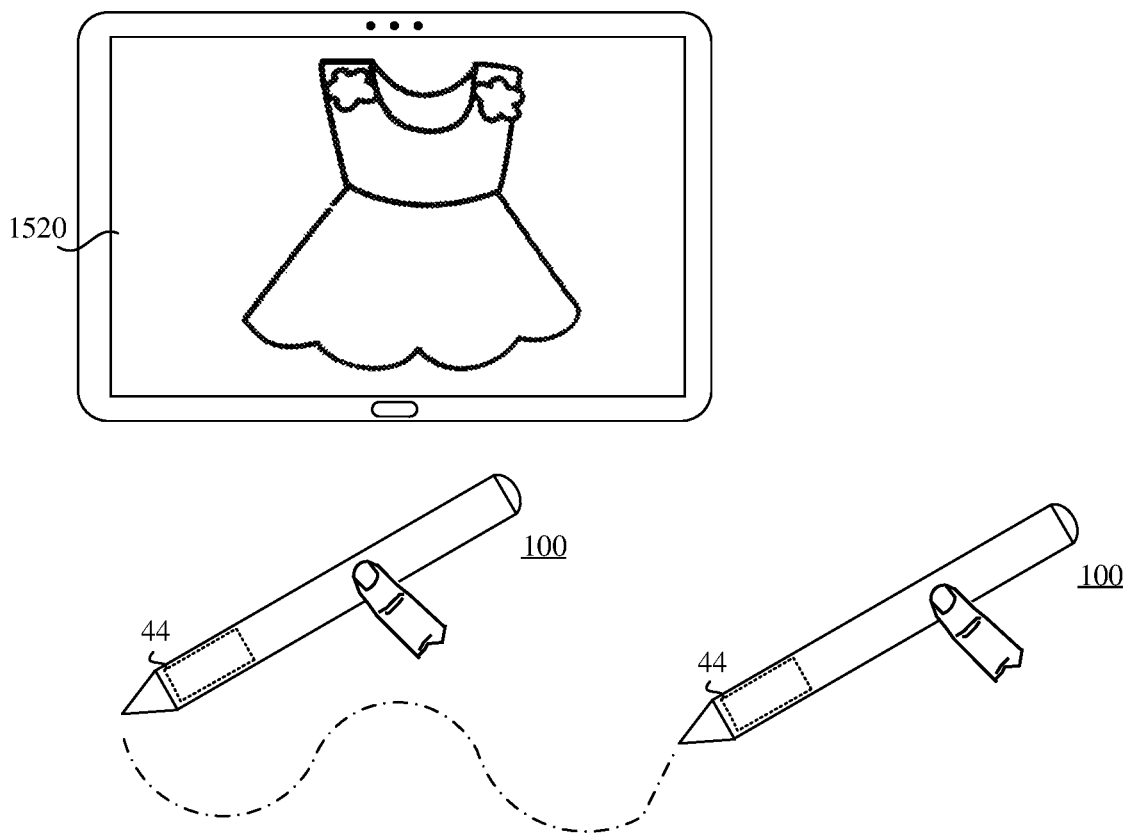

Next, with reference to FIG. 11A to FIG. 11T, an application scenario of a function mode switching method provided in an embodiment of this application are introduced.

The stylus 100 is in the first mode:

a function 1 being an eraser function is used as an example. As shown in FIG. 11A, the electronic device 200 may display a user interface 1100. The user interface 1100 may include handwriting 1101. The stylus 100 may receive the input 1 (for example, double clicking) performed on the region of the touch sensor 44. In response to the input 1, the stylus 100 may obtain the function signal 1 corresponding to the input 1, and send the function signal 1 to the electronic device 200 based on the wireless communication connection (for example, a Bluetooth connection) or an electrode. The function signal 1 may instruct the electronic device 200 to perform the function 1.

As shown in FIG. 11B, the stylus 100 may continuously send downlink signals to the electronic device 200 through the electrode. When the electronic device 200 receives the function signal 1 from the stylus 100 through the Bluetooth module, the electronic device 200 may determine the position of the stylus 100 on the touch screen based on the downlink signal from the electrode of the stylus 100, and then, erase the handwriting at a corresponding position based on the function signal 1 (that is, cancel a display of the handwriting at the position). The electronic device 200 may display the erased partial handwriting 1101 in the user interface 1100. The electronic device 200 determines the position of the stylus on the touch screen according to the function signal 1. Reference may be made to the related description of the electronic device 200, the position of the stylus is determined on the touch screen according to the downlink signal, which is not repeated herein.

A function 2 being a function of turning a page to display a previous page is used as an example. As shown in FIG. 11C, the electronic device 200 may display a user interface 1200 (also referred to as a first page). The user interface 1200 may include a screen 1201 and a page number identifier 1202. The page number identifier 1202 may be configured to indicate a position relationship between the currently displayed page and other pages. The page identifier 1202 is text information "2". The stylus 100 may receive the input 2 (for example, upward swiping operation) performed on the region of the touch sensor 44. In response to the input 2, the stylus 100 may obtain the function signal 2 corresponding to the input 2, and send the function signal 2 to the electronic device 200 based on the wireless communication connection (for example, a Bluetooth connection) or an electrode.

As shown in FIG. 11D, the electronic device 200 may perform the corresponding function 2 based on the function signal 2. The electronic device 200 may display a user interface 1300 (also referred to as a second page). The user interface 1300 may include a screen 1301 and a page number identifier 1302. The page number identifier 1302 is text information "1", indicating that the page is the previous page of the page in the user interface 1200.

A function 3 being a function of turning a page to display a next page is used as an example. As shown in FIG. 11E, the electronic device 200 may display a user interface 1200. For the description of the user interface 1200, reference may be made to the description in the embodiment shown in FIG. 11C, and details are not repeated herein. The stylus 100 may receive the input 3 (for example, downward swiping operation) performed on the region of the touch sensor 44. In response to the input 3, the stylus 100 may obtain the function signal 3 corresponding to the input 3, and send the function signal 3 to the electronic device 200 based on the wireless communication connection (for example, a Bluetooth connection) or an electrode.

As shown in FIG. 11F, the electronic device 200 may perform the corresponding function 3 based on the function signal 3. The electronic device 200 may display a user interface 1400 (also referred to as a third page). The user interface 1400 may include a screen 1401 and a page number identifier 1402. The page number identifier 1402 is text information "3", indicating that the page is the next page of the page in the user interface 1200.

The stylus 100 is switched from the first mode to the second mode.

In a possible implementation, as shown in FIG. 11G, the stylus 100 may detect strength of the specified signal 1 sent by the electronic device 200. When the stylus 100 detects that the strength of the specified signal 1 is less than the specified value 1, the stylus 100 is switched from the first mode to the second mode. For example, the specified signal 1 may be the uplink signal sent by the electrode signal sensing array 202 in the touch screen of the electronic device 200, and the specified value 1 may be −50 dbm. The electrode 160 in the stylus 100 may detect the strength of the uplink signal sent by the electrode signal sensing array 202 in the touch screen of the electronic device 200. When the stylus 100 detects that the strength of the electrical signal is less than −50 dbm, the stylus 100 is switched from the first mode to the second mode.

In another possible implementation, as shown in FIG. 11H, when the stylus 100 detects, through a gyroscope in the inertial sensor 130, that the pen tip points upward and detects the upward swiping operation and the downward swiping operation performed on the region of the touch sensor 44, the stylus 100 may be switched from the first mode to the second mode in response to the operation.

It should be noted that, the stylus 100 may further be switched from the first mode to the second mode in response to other operations. For example, the stylus 100 may detect a multi-touch operation (for example, continuously touching the region of the touch sensor 44 on the stylus 100 three times) performed on a region of the touch sensor 44. The stylus 100 may be switched from the first mode to the second mode in response to the multi-touch operation. A manner in which the stylus 100 is switched from the first mode to the second mode is not limited in this application.

The stylus 100 is in the second mode:

the stylus 100 and the electronic device 200 have established a wireless communication connection. In this embodiment of this application, the Bluetooth connection is used as an example. The stylus 100 may be within a specified range 1 (for example, 10 meters) from the electronic device 200. In the second mode, the electronic device 200 may display a cursor on the touch control screen. When the stylus 100 obtains displacement information of the stylus 100 through the gyroscope, the stylus 100 may send the displacement information to the electronic device 200 based on the Bluetooth connection. After receiving the displacement information, the electronic device 200 may move the cursor to a corresponding position on the touch control screen based on the displacement information.

A function 4 being a function of moving the cursor is used as an example. As shown in FIG. 11I, the electronic device 200 may display a user interface 1500. The user interface 1500 may include a Bluetooth icon 1501, a cursor 1502, and one or more application icons (for example, a weather application icon, a stock application icon, a calculator application icon, a settings application icon, an email application icon, a theme application icon, a calendar application icon, a drawing application icon 1503, or the like). The Bluetooth icon 1501 may be configured to instruct the stylus 100 and the electronic device 200 to establish the Bluetooth connection. A page indicator may further be displayed below the one or more application icons to indicate a position relationship between the currently displayed page and other pages.

As shown in FIG. 11I, the stylus 100 may detect the input 4 performed on a back-side region of the touch sensor 44, for example, press the back-side region, and simultaneously move as the stylus 100 shown in FIG. 11J. When the stylus 100 moves, the stylus 100 may obtain displacement information 1 of the stylus 100 through the gyroscope. When the stylus 100 moves, the stylus 100 may obtain the corresponding function signal 4 in response to the input 4. The stylus 100 may send the function signal 4 and the displacement information 1 to the electronic device 200 based on the Bluetooth connection. Based on the function signal 4 and the displacement information 1, the electronic device 200 may perform the corresponding function 4, display a cursor 1502, and cause the cursor 1502 to move a corresponding position on the touch screen. The electronic device 200 may display a position of the cursor 1502 after movement in the user interface 1500. As shown in FIG. 11J, the cursor 1502 may be located in a region of the drawing application icon 1503.

A function 5 being starting the selected application is used as an example. As shown in FIG. 11K, the electronic device 200 may display a user interface 1510. For the description of interface elements in the user interface 1510, reference may be made to the description in the embodiment shown in FIG. 11I, and details are not repeated herein. In the user interface 1510, the cursor 1502 is located in the region of the drawing application icon 1503 to indicate that the drawing application is selected by the cursor 1502. The stylus 100 may receive the input 1 (for example, double clicking) performed on the region of the touch sensor 44. In response to the input 1, the stylus 100 may obtain the function signal 5 corresponding to the input 1 in the second mode, and send the function signal 5 to the electronic device 200 based on the Bluetooth connection.

As shown in FIG. 11L, using the selected application as a drawing application (which may also be referred to as a first application) as an example, the electronic device 200 performs the corresponding function 5 based on the function signal 5. That is, the electronic device 200 may start the drawing application. The electronic device 200 may display a user interface 1520. The user interface 1520 may include a screen 1521.

A function 6 being a function of swiping up a page is used as an example. As shown in FIG. 11M, the electronic device 200 may display a user interface 1520. For the description of the user interface 1520, reference may be made to the description in the embodiment shown in FIG. 11L, and details are not repeated herein. The stylus 100 may receive the input 2 (for example, upward swiping operation) performed on the region of the touch sensor 44. In response to the input 2, the stylus 100 may obtain the function signal 6 corresponding to the input 2 in the second mode, and send the function signal 6 to the electronic device 200 based on the Bluetooth connection.

As shown in FIG. 11N, the electronic device 200 may perform the corresponding function 6 based on the function signal 6. The electronic device 200 may display a user interface 1530. The user interface 1530 may include a screen 1531 (which may also be referred to as a first region), and the screen 1531 is a screen displayed after the page in the user interface 1520 is swiped upward.

A function 7 being a function of swiping down a page is used as an example. As shown in FIG. 11O, the electronic device 200 may display a user interface 1520. For the description of the user interface 1520, reference may be made to the description in the embodiment shown in FIG. 11L, and details are not repeated herein. The stylus 100 may receive the input 3 (for example, downward swiping operation) performed on the region of the touch sensor 44. In response to the input 3, the stylus 100 may obtain the function signal 7 corresponding to the input 3 in the second mode, and send the function signal 7 to the electronic device 200 based on the Bluetooth connection.

As shown in FIG. 11P, the electronic device 200 may perform the corresponding function 7 based on the function signal 7. The electronic device 200 may display a user interface 1540. The user interface 1540 may include a screen 1541 (which may also be referred to as a second region), and the screen 1541 is a screen displayed after the page in the user interface 1520 is swiped downward.

A function 8 being a function of handwriting at a long distance is used as an example. As shown in FIG. 11Q, the electronic device 200 may display a user interface 1520. For the description of the user interface 1520, reference may be made to the description in the embodiment shown in FIG. 11Q, and details are not repeated herein. The stylus 100 may receive the input 5 performed on a front-side region of the touch sensor 44, for example, press the front-side region, and simultaneously move as the stylus 100 shown in FIG. 11R. When the stylus 100 moves, the stylus 100 may obtain displacement information 2 of the stylus 100 through the gyroscope. When the stylus 100 moves, the stylus 100 may obtain the corresponding function signal 8 in response to the input 5. The stylus 100 may send the function signal 8 and the displacement information 2 to the electronic device 200 based on the Bluetooth connection.

As shown in FIG. 11R, the electronic device 200 may perform the corresponding function 8 based on the function signal 8 and the displacement information 2, so that a trace of handwriting is displayed on the display screen. The electronic device 200 may display a user interface 1550. The user interface 1550 includes handwriting 1551A. A shape of the handwriting 1551A is the same as a displacement trajectory of the stylus 100.

A function 9 being a function of starting a specified application is used as an example. For example, in this embodiment of this application, the specified application may be a drawing application. The electronic device 200 may display a user interface 1500 as shown in FIG. 11I. The stylus 100 may receive an input 6 for the stylus 100, for example, long press the region of the touch sensor 44, and the stylus 100 detects a shaking operation of the stylus 100 through the acceleration sensor. In response to the input 6, the stylus 100 may obtain the function signal 9 corresponding to the input 6, and send the function signal 9 to the electronic device 200 based on the Bluetooth connection. After receiving the function signal 9, the electronic device 200 may start the drawing application. The electronic device 200 may display a user interface 1520 as shown in FIG. 11L.

It should be noted that, the specified application is not limited to the drawing application, and may further be other applications (for example, a calendar application, a theme application, a weather application, or the like). The specified application may be preset, for example, may be set in advance by the user or set by a system. The stylus 100 may receive the input 6 for the stylus 100 and cause the electronic device 200 to start the specified application based on the input 6.

In some embodiments, when the stylus 100 does not detect a touch operation on the region of the touch sensor 44, movement of the stylus 100 does not trigger the electronic device 200 to perform any operation.

For example, as shown in FIG. 11S, the electronic device 200 may display a user interface 1520. For the description of the user interface 1520, reference may be made to the description in the embodiment shown in FIG. 11L, and details are not repeated herein. When the touch operation is not performed on the region of the touch sensor 44, the stylus 100 cannot detect that an operation is not performed in the region of the touch sensor 44. In addition, as shown in FIG. 11T, when the stylus 100 moves, the electronic device 200 is not triggered to perform any operation. The electronic device 200 displays the same user interface 1520 as the user interface shown in FIG. 11S.

Next, a specific flow of a function mode switching method provided in an embodiment of this application is introduced.

Figure 12:
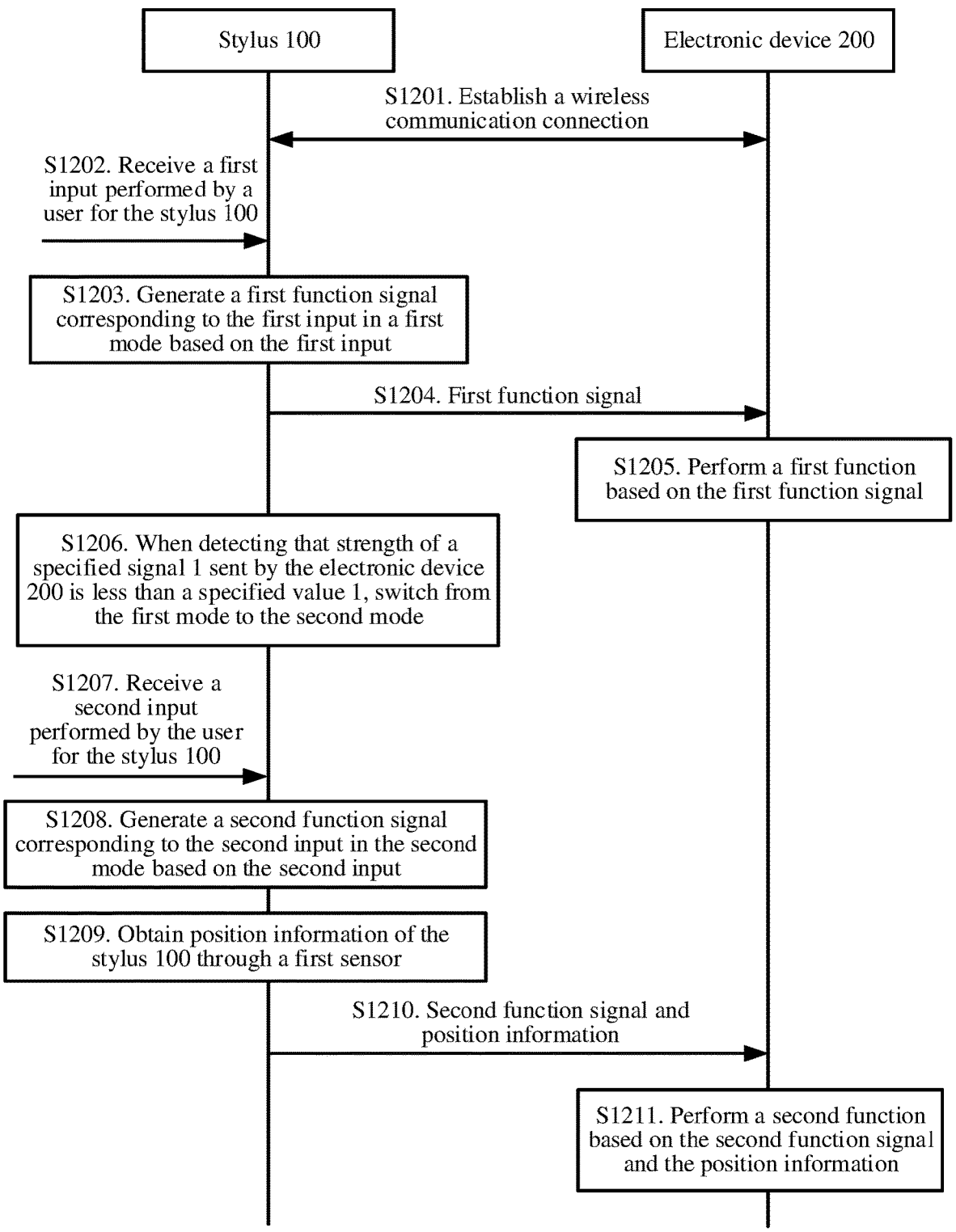
FIG. 12 is a schematic flowchart of a specific flow of a function mode switching method according to an embodiment of this application.

FIG. 12 exemplarily shows a schematic flowchart of a specific flow of a function mode switching method according to an embodiment of this application.

The method may specifically include:

S1201. A stylus 100 and an electronic device 200 establish a wireless communication connection.

Specifically, in this embodiment of this application, the Bluetooth connection is used as an example. The electronic device 200 may detect or scan the stylus 100 by emitting a signal through the Bluetooth module, and establish a wireless communication connection with the stylus 100 and transmit data. The Bluetooth module may provide a solution including one or more of Bluetooth communications in classic Bluetooth (Bluetooth 2.1 standard) or Bluetooth lower power consumption.

In some embodiments, the electronic device 200 may also detect or scan the stylus 100 by emitting a signal through a WLAN module, and establish a wireless communication connection with the stylus 100 and transmit data. The WLAN module may provide a WLAN communication solution including one or more of Wi-Fi direct, Wi-Fi LAN or Wi-Fi softAP.

In some other embodiments, the stylus 100 may also establish a wireless communication connection with the electronic device 200 through data exchange of wireless communication such as frequency modulation (frequency modulation, FM), near field communication (near field communication, NFC), or infrared (infrared, IR). This is not limited in this application.

S1202. The stylus 100 detects a first input performed by the user for the stylus 100.

Specifically, the first input may be the input 1, the input 2, or the input 3 in the embodiments shown in FIG. 11A to FIG. 11T, such as single touching, double-clicking, multi-touching, upward swiping operation, downward swiping operation, short pressing, or long pressing performed on the touch sensor region. Single touching may be touching once, double touching may be understood as touching twice, and multi-touching may be understood as touching N times, where N is an integer greater than 2. Short pressing may be that a duration of the touch sensor is shorter than a first preset duration, and long pressing may be that a duration of the touch sensor is longer than a second preset duration, and the first preset duration is less than the second preset duration.

The stylus 100 may collect operation data of the user for the stylus 100 through the touch sensor, and then send the operation data to the processor. The processor may detect the first input performed by the user according to the operation data of the user, so that the stylus 100 detects the first input performed by the user for the stylus 100.

S1203. The stylus 100 generates a first function signal corresponding to the first input in the first mode based on the first input.

Specifically, the stylus 100 may be in a first mode.

In the first mode, the first input corresponds to the first function signal, and the first function signal corresponds to the first function. The first function signal may be the function signal 1, the function signal 2, or the function signal 3 in the embodiments shown in FIG. 11A to FIG. 11T. The first function may be the function 1, the function 2, or the function 3 in the embodiments shown in FIG. 11A to FIG. 11T, such as, the eraser function, the function of turning a page to display a previous page, the function of turning a page to display a next page, or the like.

When the stylus 100 detects the first input, the stylus 100 may generate a first function signal corresponding to the first input in the first mode.

S1204. The stylus 100 sends the first function signal to the electronic device 200.

Specifically, in the first mode, the stylus 100 may send the first function signal to the electronic device 200 through the wireless communication connection established in the step S1201.

In this embodiment of this application, the wireless communication connection uses the Bluetooth connection as an example. Specifically, both the stylus 100 and the electronic device 200 may store: in the first mode, each input (for example, a first input, or the like), a function signal (for example, a first function signal), an identifier in the function signal (for example, a first identifier in the first function signal, or the like), and a mapping relationship between the identifier in the function signal (for example, the first identifier in the first function signal, or the like) and a function (for example, a first function corresponding to the first function signal, or the like). The identifier in the function signal may be a name, a number, or the like of the function. When detecting an input performed by the user on the stylus 100, the stylus 100 may determine the identifier in the function signal sent to the electronic device 200 according to the input and the mapping relationship. After receiving the identifier in the function signal, the electronic device 200 may determine which function needs to be performed according to the identifier and the mapping relationship.

For example, after the stylus 100 receives the first input performed by the user for the stylus 100, the stylus 100 may determine the first function signal that is sent to the electronic device 200 based on the first input and the stored mapping relationship in the first mode. The stylus 100 may send the first function signal through the Bluetooth module. The first function signal is a Bluetooth signal. The first function signal includes a first identifier.

S1205. After the electronic device 200 receives the first function signal, the electronic device 200 performs the first function based on the first function signal.

Specifically, the electronic device 200 may determine the performed first function through the first identifier in the first function. Then, the electronic device 200 may perform the first function.

For example, using the embodiments shown in FIG. 11A to FIG. 11B as an example, the first input is double-clicking the touch sensor region, the first function signal is the function signal 1, and the first function is the eraser function. The electronic device 200 may receive the first function signal sent by the stylus 100 through a wireless communication connection (for example, a Bluetooth connection). The first function signal includes a first identifier. The electronic device 200 may determine the performed first function according to the first identifier. In the implementation, the stylus 100 may continuously send downlink signals to the electronic device 200 through an electrode. When the electronic device 200 receives the first function signal through the wireless communication connection (for example, the Bluetooth connection), the electronic device 200 may determine the position of the stylus 100 on the touch screen based on the downlink signal sent from the electrode of the stylus 100, and then, erase the handwriting at a corresponding position.

S1206. When the stylus 100 detects that the strength of the specified signal 1 sent by the electronic device 200 is less than the specified value 1, the stylus 100 is switched from the first mode to the second mode.

Specifically, the stylus 100 may also detect strength of the specified signal 1 (for example, the uplink signal in the foregoing description) sent by the electronic device 200. When it is detected that the strength of the specified signal 1 is less than a specified value 1 (for example, −50 dbm), the stylus 100 may be switched from the first mode to the second mode.

For example, the specified signal 1 may be the uplink signal sent by the electrode signal sensing array 202 in the touch screen of the electronic device 200, and the specified value 1 may be −50 dbm. The electrode 160 in the stylus 100 may detect the strength of the uplink signal sent by the electrode signal sensing array 202 in the touch screen of the electronic device 200. When the stylus 100 detects that the strength of the electrical signal is less than −50 dbm, the stylus 100 is switched from the first mode to the second mode.

In a possible implementation, the stylus 100 may detect a specified switching operation 1 performed on the stylus 100 by the user. The stylus 100 may perform function mode switching (for example, switch from the first mode to the second mode, or switch from the second mode to the first mode) in response to the specified switching operation 1. The specified operation 1 may be, for example, a multi-touch operation on a region of the touch sensor 44 (for example, continuously touching the region of the touch sensor 44 on the stylus 100 three times), a long-pressing operation on the region of the touch sensor 44, or the like. This is not limited in this application.

In a possible implementation, the electronic device 200 may detect the electrical signal released by electrode in the stylus 100. When the electronic device 200 determines that the electrical signal released by the electrode in the stylus 100 is less than the specified value 1 (for example, −50 dbm), a function mode switching instruction 1 may be sent to the stylus 100 through the wireless communication connection, so that the stylus 100 may be switched from the first mode to the second mode based on the function mode switching instruction 1. When the electronic device 200 determines that the electrical signal released by the electrode in the stylus 100 is greater than the specified value 1, a function mode switching instruction 2 may be sent to the stylus 100 through the wireless communication connection, so that the stylus 100 may be switched from the second mode to the first mode based on the function mode switching instruction 2.

S1207. The stylus 100 detects a second input performed by the user for the stylus 100.

Specifically, the second input may be the input 4, the input 5, or the input 6 in the embodiments shown in FIG. 11A to FIG. 11T.

The stylus 100 may collect operation data of the user for the stylus 100 through the touch sensor, collect displacement data of the stylus 100 through the gyroscope sensor, and then send the operation data and the displacement data to the processor. The processor may detect the second input performed by the user according to the operation data and the displacement data of the user, so that the stylus 100 detects the second input performed by the user for the stylus 100. That is, when the stylus 100 detects the operation performed by the user on the region of the touch sensor 44 and the stylus 100 moves, the stylus 100 determines the second input performed by the user for the stylus 100, so that the stylus 100 may perform subsequent operations based on the second input.

S1208. The stylus 100 generates a second function signal corresponding to the second input in the second mode based on the second input.

Specifically, the stylus 100 is in the second mode.

In the second mode, the second input corresponds to the second function signal, and the second function signal corresponds to the second function. The second function signal may be the function signal 4, the function signal 8, or the function signal 9 in the embodiments shown in FIG. 11A to FIG. 11T. The second function may be the function 4, the function 8, or the function 9 in the embodiments shown in FIG. 11A to FIG. 11T, for example, the function of moving a cursor, the function of handwriting at a long distance, and the function of starting a specified application, or the like.

When the stylus 100 detects the second input, the stylus 100 may generate a second function signal corresponding to the second input in the second mode.

S1209. The stylus 100 obtains position information of the stylus 100 through the first sensor.

Specifically, the first sensor may be a gyroscope sensor. The stylus 100 may obtain position information when the stylus 100 moves through the gyroscope sensor. Then, the stylus 100 may send the obtained position information to the electronic device 200 every specified period (for example, 0.1 second). The position information may be the displacement information 1 or the displacement information 2 in the embodiments shown in FIG. 11A to FIG. 11T.

In a possible implementation, the first sensor may also be an accelerometer. The stylus 100 may obtain the position information when the stylus 100 moves through the accelerometer, and send the obtained position information to the electronic device 200 every specified period (for example, 0.1 second).

S1210. The stylus 100 sends the second function signal and the position information to the electronic device 200.

Specifically, in the second mode, the stylus 100 may send the second function signal and the position information to the electronic device 200 through the wireless communication connection established in the step S1201.

In this embodiment of this application, the wireless communication connection uses the Bluetooth connection as an example. Specifically, both the stylus 100 and the electronic device 200 may store: in the second mode, each input (for example, a second input, or the like), a function signal (for example, a second function signal), an identifier in the function signal (for example, a second identifier in the second function signal, or the like), and a mapping relationship between the identifier in the function signal (for example, the second identifier in the second function signal, or the like) and a function (for example, a second function corresponding to the second function signal, or the like). The identifier in the function signal may be a name, a number, or the like of the function. When detecting an input performed by the user on the stylus 100, the stylus 100 may determine the identifier in the function signal sent to the electronic device 200 according to the input and the mapping relationship. After receiving the identifier in the function signal, the electronic device 200 may determine which function needs to be performed according to the identifier and the mapping relationship.

For example, after the stylus 100 receives the second input performed by the user for the stylus 100, the stylus 100 may determine the second function signal that is sent to the electronic device 200 based on the first input and the stored mapping relationship in the second mode. The stylus 100 may send the second function signal and the position information through the Bluetooth module. The second function signal is a Bluetooth signal. The second function signal includes a second identifier.

S1211. After receiving the second function signal and the position information, the electronic device 200 performs the second function based on the second function signal and the position information.

Specifically, the electronic device 200 may determine the performed second function through the second identifier in the second function. Then, the electronic device 200 may perform the second function based on the position information.

For example, using the embodiments shown in FIG. 11I to FIG. 11J as an example, the second input is pressing the back-side region and moving as the stylus 100 shown in FIG. 11J. The third function signal is the function signal 4, and the second function is the function of moving a cursor. The electronic device 200 may receive the second function signal and the position information sent by the stylus 100 through the wireless communication connection (for example, the Bluetooth connection). The second function includes a second identifier, so that the electronic device 200 determines the performed second function based on the second identifier. Then, the electronic device 200 may perform the second function based on the position information, so that the cursor and the movement effect of the cursor are displayed on the display screen.

In some embodiments, the electronic device 200 and the stylus 100 may further store: in the second mode, the first input, the third function signal, and a mapping relationship between the third identifier in the third function signal and the third function. That is, in both the first mode and the second mode, the stylus 100 may receive the first input. In different modes, the stylus 100 may generate different function signals based on the first input, so that the electronic device 200 performs different functions based on the different function signals. Different from the first mode, in the second mode, the first input corresponds to the third function signal and the third function. The third function signal is different from the first function signal, and the third function is different from the first function. The third identifier in the third function signal may be a name, a number, or the like of the function. When detecting the first input performed by the user on the stylus 100, the stylus 100 may determine the third function signal and the identifier in the third function signal sent to the electronic device 200 according to the input and the mapping relationship. After receiving the third identifier in the third function signal, the electronic device 200 may determine that the third function is performed according to the identifier and the mapping relationship.

For example, using FIG. 11K to FIG. 11L as an example, the first input may be double-clicking the touch sensor region. Different from the first mode, the third function signal corresponding to the first input in the second mode is the function signal 5, and the third function is starting the selected application. The electronic device 200 may receive the third function signal sent by the stylus 100 through the wireless communication connection (for example, the Bluetooth connection). The third function signal includes a third identifier. The electronic device 200 may determine the performed third function according to the third identifier, that is, start the selected drawing application. In the first mode, as shown in FIG. 11A to FIG. 11B, the function performed by the electronic device 200 corresponding to the first input is an eraser function.

It should be noted that, an order of the foregoing steps is only configured to exemplarily explain a specific flow of the method, and does not constitute a specific limit to this application.

It should be noted that, the user interface examples are only configured to explain this application, and should not constitute a limit to this application.

As used in the foregoing embodiments, based on the context, the term "when" may be interpreted as a meaning of "if", "after", "in response to determining . . . ", or "in response to detecting . . . ". Similarly, based on the context, the phrase "if determining" or "if detecting (a stated condition or event)" may be interpreted as a meaning of "when determining . . . ", "in response to determining . . . ", "when detecting (a stated condition or event)", or "in response to detecting . . . (a stated condition or event)".

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The foregoing storage medium includes: any medium that can store program code, such as a ROM, a random access memory RAM, a magnetic disk, or an optical disc.

What is claimed is:

1. A method, applied to a communication system comprising a stylus and an electronic device, the method comprising:
    establishing, by the stylus and the electronic device, a wireless communication connection;
    detecting, by the stylus, a first input when the stylus is in a first mode;
    in response to detecting the first input, sending, by the stylus, a first function signal corresponding to the first input in the first mode based on the wireless communication connection;
    performing, by the electronic device, a first function based on the first function signal;
    switching, by the stylus, from the first mode to a second mode in a case that the stylus detects that a strength of an electrical signal released by a touch control screen in the electronic device is less than a first value;
    detecting, by the stylus, a second input when the stylus is in the second mode;
    detecting, by the stylus, position information of the stylus when the stylus is in the second mode;
    in response to the second input, sending, by the stylus, a second function signal corresponding to the second input in the second mode and the position information based on the wireless communication connection; and
    performing, by the electronic device, a second function based on the second function signal and the position information.

2. The method according to claim 1, wherein the wireless communication connection is:
    a Bluetooth communication connection, or a wireless local area network (WLAN) communication connection.

3. The method according to claim 1, wherein the first input comprises any one of the following:
    an upward swiping operation for a touch sensor region in the stylus, a downward swiping operation for the touch sensor region in the stylus, or an operation of double-clicking the touch sensor region; and
    wherein the second input comprises any one of the following:
        pressing a front-side region of a touch sensor in the stylus and moving the stylus, pressing a back-side region of the touch sensor in the stylus and moving the stylus, an upward swiping operation for a touch sensor region in the stylus, a downward swiping operation for the touch sensor region in the stylus, or an operation of double-clicking the touch sensor region.

4. The method according to claim 1, wherein performing, by the electronic device, the first function based on the first function signal comprises:
    displaying, by the electronic device, handwriting;
    receiving, by the electronic device, the first function signal;
    determining, by the electronic device, a position of the stylus on a touch control screen in the electronic device through a downlink signal sent by an electrode in the stylus; and
    canceling, by the electronic device, a display of handwriting of the position on the touch control screen based on the first function signal.

5. The method according to claim 1, wherein performing, by the electronic device, the first function based on the first function signal comprises:
    displaying, by the electronic device, a first page;
    receiving, by the electronic device, the first function signal; and
    displaying, by the electronic device, a second page in response to the first function signal, wherein the second page is a previous-level page of the first page.

6. The method according to claim 1, wherein performing, by the electronic device, the first function based on the first function signal comprises:
    displaying, by the electronic device, a first page;
    receiving, by the electronic device, the first function signal; and
    displaying, by the electronic device, a third page in response to the first function signal, wherein the third page is a next-level page of the first page.

7. The method according to claim 1, wherein performing, by the electronic device, the second function based on the second function signal and the position information comprises:
    displaying, by the electronic device, handwriting of a corresponding position of the position information based on the second function signal and the position information.

8. The method according to claim 1, wherein performing, by the electronic device, the second function based on the second function signal and the position information comprises:
    displaying, by the electronic device, a cursor; and
    displaying, by the electronic device, a cursor movement trajectory of a corresponding position of the position information based on the second function signal and the position information.

9. The method according to claim 1, wherein the second input comprises any one of the following:

pressing a front-side region of a touch sensor in the stylus and moving the stylus, pressing a back-side region of the touch sensor in the stylus and moving the stylus, an upward swiping operation for a touch sensor region in the stylus, a downward swiping operation for the touch sensor region in the stylus, or an operation of double-clicking the touch sensor region.

10. The method according to claim 1, wherein the position information is detected and obtained by a gyroscope in the stylus.

11. The method according to claim 1, further comprising:
detecting, by the stylus, the first input when the stylus is in the second mode;
in response to detecting the first input when the stylus is in the second mode, sending, by the stylus, a third function signal corresponding to the first input in the second mode based on the wireless communication connection; and
performing, by the electronic device, a third function based on the third function signal.

12. The method according to claim 11, wherein performing, by the electronic device, the third function based on the third function signal comprises:
displaying, by the electronic device, a cursor, wherein the cursor is located in an application icon region of a first application;
receiving, by the electronic device, the third function signal; and
starting, by the electronic device, the first application in response to the third function signal.

13. The method according to claim 11, wherein performing, by the electronic device, the third function based on the third function signal comprises:
displaying, by the electronic device, a first page;
receiving, by the electronic device, the third function signal; and
displaying, by the electronic device, a first region on the first page in response to the third function signal, wherein the first region is an upper part region on the first page.

14. The method according to claim 11, wherein performing, by the electronic device, the third function based on the third function signal comprises:
displaying, by the electronic device, a first page;
receiving, by the electronic device, the third function signal; and
displaying, by the electronic device, a second region on the first page in response to the third function signal, wherein the second region is a lower part region on the first page.

15. A stylus, comprising:
a processor, a touch sensor, a motion sensor, and a wireless communication interface, wherein:

the wireless communication interface is configured to establish a wireless communication connection with an electronic device;
the touch sensor is configured to detect a first input when the stylus is in a first mode;
the wireless communication interface is configured to send, in response to the first input, a first function signal corresponding to the first input in the first mode;
the processor is further configured to control the stylus to switch from the first mode to a second mode in response to detecting that strength of an electrical signal released by a touch control screen in the electronic device is less than a first value;
the touch sensor is further configured to detect a second input when the stylus is in a second mode;
the motion sensor is configured to detect position information of the stylus when the stylus is in the second mode; and
the wireless communication interface is further configured to send, in response to the second input, a second function signal corresponding to the second input in the second mode and the position information to the electronic device.

16. The stylus according to claim 15, wherein the first input comprises any one of the following:
an upward swiping operation for a touch sensor region in the stylus, a downward swiping operation for the touch sensor region in the stylus, or an operation of double-clicking the touch sensor region.

17. The stylus according to claim 15, wherein the wireless communication connection is:
a Bluetooth communication connection, or a wireless local area network (WLAN) communication connection.

18. The stylus according to claim 15, wherein the second input comprises any one of the following:
pressing a front-side region of a touch sensor in the stylus and moving the stylus, pressing a back-side region of the touch sensor in the stylus and moving the stylus, an upward swiping operation for a touch sensor region in the stylus, a downward swiping operation for the touch sensor region in the stylus, or an operation of double-clicking the touch sensor region.

19. The stylus according to claim 15, further comprising:
an electrode, wherein the electrode is configured to send a downlink signal to the electronic device.

20. The stylus according to claim 15, wherein the touch sensor is further configured to detect the first input; and
wherein the wireless communication interface is further configured to send, in response to detecting the second input, a third function signal corresponding to the first input in the second mode to the electronic device.

* * * * *